US012593165B2

(12) United States Patent
Zheng et al.

(10) Patent No.: US 12,593,165 B2
(45) Date of Patent: Mar. 31, 2026

(54) ACOUSTIC INPUT-OUTPUT DEVICES

(71) Applicant: SHENZHEN SHOKZ CO., LTD., Guangdong (CN)

(72) Inventors: Jinbo Zheng, Shenzhen (CN); Fengyun Liao, Shenzhen (CN); Xin Qi, Shenzhen (CN)

(73) Assignee: SHENZHEN SHOKZ CO., LTD., Shenzhen (CN)

(*) Notice: Subject to any disclaimer, the term of this patent is extended or adjusted under 35 U.S.C. 154(b) by 258 days.

(21) Appl. No.: 18/327,873

(22) Filed: Jun. 1, 2023

(65) Prior Publication Data

US 2023/0319463 A1 Oct. 5, 2023

Related U.S. Application Data

(63) Continuation of application No. PCT/CN2021/090298, filed on Apr. 27, 2021.

(51) Int. Cl.
*H04R 1/28* (2006.01)
*H04R 1/08* (2006.01)
(Continued)

(52) U.S. Cl.
CPC ............... *H04R 1/288* (2013.01); *H04R 1/08* (2013.01); *H04R 1/1008* (2013.01);
(Continued)

(58) Field of Classification Search
CPC ........ H04R 1/288; H04R 1/08; H04R 1/1008; H04R 1/1075; H04R 5/033; H04R 9/025; H04R 9/063; H04R 2460/13
(Continued)

(56) References Cited

U.S. PATENT DOCUMENTS 6,993,140 B1 * 1/2006 Chen ................ G10K 11/17885 381/74
10,015,589 B1 * 7/2018 Ebenezer ............... H04R 3/005
(Continued)

FOREIGN PATENT DOCUMENTS

CN 107750026 A 3/2018
CN 108307256 A 7/2018
(Continued)

OTHER PUBLICATIONS

International Search Report in PCT/CN2021/090298 mailed on Dec. 7, 2021, 7 pages.
(Continued)

*Primary Examiner* — Norman Yu
(74) *Attorney, Agent, or Firm* — METIS IP LLC

(57) ABSTRACT

The embodiments of the present disclosure disclose an acoustic input-output device. The acoustic input-output device includes a loudspeaker assembly and a microphone. The loudspeaker assembly is configured to transmit sound waves by generating a first mechanical vibration. The microphone is configured to receive a second mechanical vibration of a voice signal source that is generated when the voice signal source provides a voice signal. The microphone generates a first signal and a second signal in response to the first mechanical vibration and the second mechanical vibration, respectively. In a specific frequency range, a ratio of an intensity of the first mechanical vibration to an intensity of the first signal is greater than a ratio of an intensity of the second mechanical vibration to an intensity of the second signal.

19 Claims, 19 Drawing Sheets

(51) Int. Cl.

| | |
|---|---|
| ***H04R 1/10*** | (2006.01) |
| ***H04R 5/033*** | (2006.01) |
| ***H04R 9/02*** | (2006.01) |
| ***H04R 9/06*** | (2006.01) |

(52) U.S. Cl.
CPC ........... *H04R 1/1075* (2013.01); *H04R 5/033* (2013.01); *H04R 9/025* (2013.01); *H04R 9/063* (2013.01); *H04R 2460/13* (2013.01)

(58) Field of Classification Search
USPC ... 381/151, 380, 326, 56, 92, 110, 111, 309, 381/71.2
See application file for complete search history.

(56) References Cited

U.S. PATENT DOCUMENTS

| | | | | |
|---|---|---|---|---|
| 11,343,605 | B1 * | 5/2022 | Dusan | H04R 1/1041 |
| 11,350,205 | B2 | 5/2022 | Zhang et al. | |
| 2009/0304210 | A1 * | 12/2009 | Weisman | H04R 1/1083 381/151 |
| 2010/0046783 | A1 * | 2/2010 | Huang | H04R 1/1075 381/380 |
| 2011/0170718 | A1 | 7/2011 | Fukuda et al. | |
| 2012/0289162 | A1 | 11/2012 | Hosoi et al. | |
| 2015/0078570 | A1 * | 3/2015 | Grone | H04R 1/1083 381/71.6 |
| 2015/0156594 | A1 * | 6/2015 | Bervoets | H04R 1/2876 600/25 |
| 2017/0280217 | A1 * | 9/2017 | Choi | H04R 9/06 |
| 2019/0014425 | A1 * | 1/2019 | Liao | H04R 5/0335 |
| 2021/0105074 | A1 * | 4/2021 | McRae | H04R 29/001 |
| 2021/0112329 | A1 | 4/2021 | Zhang et al. | |
| 2021/0160608 | A1 | 5/2021 | Zhang et al. | |
| 2021/0168489 | A1 | 6/2021 | Zhang et al. | |

FOREIGN PATENT DOCUMENTS

| | | | |
|---|---|---|---|
| CN | 110881160 | A | 3/2020 |
| CN | 110931031 | A | 3/2020 |
| CN | 111212346 | A | 5/2020 |
| CN | 111757219 | A | 10/2020 |
| EP | 2947561 | A1 | 11/2015 |
| JP | H08265888 | A | 10/1996 |
| WO | 2009136498 | A1 | 11/2009 |

OTHER PUBLICATIONS

The Office Action in Taiwan Application No. 111115560 mailed on Jan. 11, 2023, 26 pages.

The Extended European Search Report in European Application No. 21938279.3 mailed on Mar. 13, 2024, 14 pages.

Ren, Dong, Optimization Design Of Wireless Terminal's Audio Quality, Chinese Master's Theses Full-text Database Information Science and Technology Series, 2011, 97 Pages.

Notice of Reasons for Refusal in Japanese Application No. 2023-558272 mailed on Oct. 29, 2024, 10 pages.

First Office Action in Chinese Application No. 202110460677.3 mailed on Mar. 28, 2025, 13 pages.

Mohammadhossein Behgam et al., Echo Cancellation for Bone Conduction Transducers, 2014 48th Asilomar Conference on Signals, Systems and Computers, 1629-1632, 2014.

* cited by examiner

ACOUSTIC INPUT-OUTPUT DEVICES

CROSS REFERENCE TO RELATED APPLICATIONS

This specification is a Continuation of International Application No. PCT/CN2021/090298 filed on Apr. 27, 2021, the entire contents of which are hereby incorporated by reference.

TECHNICAL FIELD

The present disclosure relates to the field of acoustics, and in particular to acoustic input-output devices.

BACKGROUND

A loudspeaker assembly transmits sound by generating mechanical vibrations. A microphone receives voice signals of a user by picking up vibrations of, e.g., the skin, when the user speaks. When the loudspeaker assembly and the microphone work at the same time, the mechanical vibrations of the loudspeaker assembly would be transmitted to the microphone, so that the microphone receives the vibration signals of the loudspeaker assembly and generates echoes, which reduces the quality of the sound signals generated by the microphone and affects the usage experience of the user.

The present disclosure provides an acoustic input-output device that may reduce the effect of the loudspeaker assembly on the microphone, reduce the intensity of the echo signals generated by the microphone, and improve the quality of the voice signals collected by the microphone.

SUMMARY

In the present disclosure, an acoustic input-output device is provided for a purpose of reducing the effect of a loudspeaker assembly on the vibration of a bone conduction microphone, reducing the intensity of echo signals generated by the bone conduction microphone, and improving the quality of sound signals picked up by the bone conduction microphone.

To achieve the above-mentioned purpose, the present disclosure provides the following technical solutions.

An acoustic input-output device a loudspeaker assembly and a microphone.

The loudspeaker assembly is configured to transmit sound waves by generating a first mechanical vibration. The microphone is configured to receive a second mechanical vibration of a voice signal source that is generated when the voice signal source provides a voice signal. The microphone generates a first signal and a second signal in response to the first mechanical vibration and the second mechanical vibration, respectively. In a specific frequency range, a ratio of an intensity of the first mechanical vibration to an intensity of the first signal is greater than a ratio of an intensity of the second mechanical vibration to an intensity of the second signal.

In some embodiments, the loudspeaker assembly is a bone conduction loudspeaker assembly. The bone conduction loudspeaker assembly includes a housing and a vibration component that is connected to the housing and configured to generate the first mechanical vibration. The microphone is directly or indirectly connected to the housing.

In some embodiments, when the user wears the acoustic input-output device, the clamping force formed between the acoustic input-output device and a contact portion of the user is within a range of 0.1N to 0.5N.

In some embodiments, the acoustic input-output device further includes a damping structure. The microphone is connected to the loudspeaker assembly through the damping structure.

In some embodiments, the damping structure includes a damping material with an elastic modulus less than a first threshold.

In some embodiments, the elastic modulus of the damping material is within a range of 0.01 Mpa to 1000 Mpa.

In some embodiments, a thickness of the damping structure is within a range of 0.5 mm to 5 mm.

In some embodiments, a first portion of a surface of the microphone is configured to conduct the second mechanical vibration. A second portion of the surface of the microphone is provided with the damping structure and connected to the loudspeaker assembly through the damping structure.

In some embodiments, the first portion of the surface of the microphone is provided with a vibration transmission layer.

In some embodiments, an elastic modulus of a material of the vibration transmission layer is greater than a second threshold.

In some embodiments, the loudspeaker assembly includes a housing and a vibration component. There is a first connection between the housing and the vibration component. There is a second connection between the microphone and the housing. The first connection includes a first damping structure.

In some embodiments, the second connection includes a second damping structure.

In some embodiments, a mass of the vibration component is within a range of 0.005 g to 0.3 g.

In some embodiments, when a user wears the acoustic input-output device, a clamping force formed between the acoustic input-output device and a contact portion of the user is within a range of 0.01N to 0.05N.

In some embodiments, the loudspeaker assembly includes a first diaphragm and a second diaphragm. Vibration directions of the first diaphragm and the second diaphragm are opposite.

In some embodiments, the loudspeaker assembly includes a housing. The housing includes a first cavity and a second cavity. The first diaphragm and the second diaphragm are located in the first cavity and the second cavity, respectively. A side wall of the first cavity is set with a first sound transmission hole and a second sound transmission hole. A side wall of the second cavity is opened with a third sound transmission hole and a fourth sound transmission hole. A phase of sound transmitted by the first sound transmission hole is the same as a phase of sound transmitted by the third sound transmission hole. A phase of sound transmitted by the second sound transmission hole is the same as a phase of sound transmitted by the fourth sound transmission hole.

In some embodiments, the first sound transmission hole and the third sound transmission hole are provided on a same side wall of the housing. The second sound transmission hole and the fourth sound transmission hole are provided on another same side wall of the housing. The first sound transmission hole and the second sound transmission hole are provided on non-adjacent side walls of the housing. The third sound transmission hole and the fourth sound transmission hole are provided on non-adjacent side walls of the housing.

In some embodiments, the loudspeaker assembly further includes a first magnetic circuit assembly and a second magnetic circuit assembly configured to form a magnetic field. The first magnetic circuit assembly is configured to cause the first diaphragm to vibrate. The second magnetic circuit assembly is configured to cause the second diaphragm to vibrate. The first cavity and the second cavity are spatially connected. The first magnetic circuit assembly and the second magnetic circuit assembly are connected directly or indirectly.

In some embodiments, the voice signal source is a vibration portion of a user providing the voice signal. When the user wears the acoustic input-output device, a distance between the vibration portion of the user and the microphone is less than a third threshold.

In some embodiments, the microphone is located close to at least one of the vocal cords, the larynx, the mouth, or the nasal cavity of the user.

In some embodiments, the acoustic input-output device further includes a fixing assembly configured to maintain stable contact between the acoustic input-output device and a user. The fixing assembly is fixedly connected to the loudspeaker assembly.

In some embodiments, the acoustic input-output device is a headset. The fixing assembly includes a headband and two earmuffs ear cups connected to both sides of the headband. The headband is configured to fix the acoustic input-output device to the skull of the user and fix the two earmuffs to both sides of the skull of the user. The microphone and the loudspeaker assembly are arranged in the two earmuffs, respectively.

In some embodiments, the acoustic input-output device is a binaural headset. One side of each earmuff in contact with the user is provided with a sponge sleeve. The microphone is accommodated in the sponge sleeve.

In some embodiments, a ratio of the intensity of the second signal to the intensity of the first signal is greater than a threshold.

An acoustic input-output device is provided in one or more embodiments of the present disclosure. The acoustic input-output device includes a loudspeaker assembly and a microphone. The loudspeaker assembly is configured to transmit sound waves by generating a first mechanical vibration. The microphone is configured to receive a second mechanical vibration of a voice signal source that is generated when the voice signal source provides a voice signal. The microphone generates a first signal and a second signal in response to the first mechanical vibration and the second mechanical vibration, respectively. A first angle formed by a vibration direction of the microphone and a direction of the first mechanical vibration is within a set angle range so that in a specific frequency range, a ratio of an intensity of the first mechanical vibration to an intensity of the first signal is greater than a ratio of an intensity of the second mechanical vibration to an intensity of the second signal.

In some embodiments, the first angle is within an angle range of 20 degrees to 90 degrees.

In some embodiments, the first angle includes 90 degrees.

In some embodiments, a second angle formed by the vibration direction of the microphone and a direction of the second mechanical vibration is within a set angle range so that the ratio of the intensity of the first mechanical vibration to the intensity of the first signal is greater than the ratio of the intensity of the second mechanical vibration to the intensity of the second signal.

In some embodiments, the second angle is within an angel range of 0 degrees to 85 degrees.

BRIEF DESCRIPTION OF THE DRAWINGS

The present disclosure is further illustrated in terms of exemplary embodiments, and these exemplary embodiments are described in detail with reference to the drawings. These embodiments are not limiting. In these embodiments, the same number indicates the same structure, wherein.

DETAILED DESCRIPTION

Figure 1:
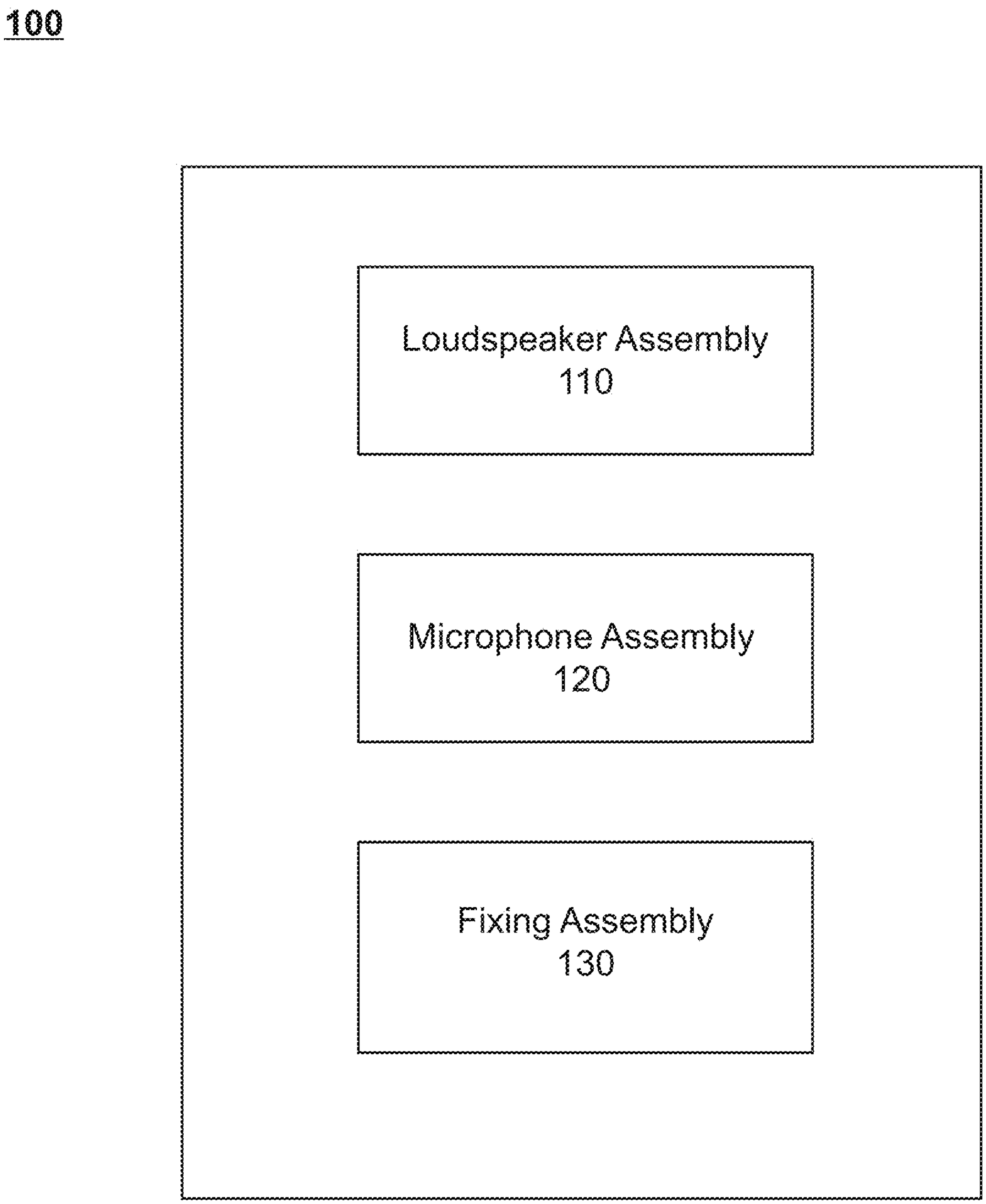
FIG. 1 is a block diagram illustrating a structure of an acoustic input-output device according to some embodiments of the present disclosure.

To illustrate the technical solutions related to the embodiments of the present disclosure, a brief introduction of the drawings referred to in the description of the embodiments is provided below. Obviously, the drawings described below are only some examples or embodiments of the present disclosure. Those skilled in the art, without further creative efforts, may apply the present disclosure to other similar scenarios according to these drawings. It should be understood that these exemplary embodiments are merely provided for those skilled in the art to better comprehend thereby realizing the present disclosure, but not limit the scope of the present disclosure in any way. Unless apparent from the locale or otherwise stated, like reference numerals represent similar structures or operations throughout the several views of the drawings.

As shown in the present disclosure and claims, unless the context clearly suggests an exception, the words "one", "a", "an" and/or "the" are not specific to the singular form, but may also include the plural form. In general, the terms "includes" and "comprises" suggest only the inclusion of clearly identified steps and elements that do not constitute an exclusive list, and the method or apparatus may also contain other steps or elements. The term "based on" is "based, at least in part, on". The term "an embodiment" means "at least one embodiment"; the term "another embodiment" means "at least one additional embodiment". Definitions of other terms will be given in the description below. In the following, without loss of generality, the description of "bone conduction microphone," "bone conduction microphone assembly," "bone conduction loudspeaker", "bone conduction loudspeaker," or "bone conduction headset" will be used when describing the bone conduction related technology in the present disclosure. The description of "air conduction microphone," "air conduction microphone assembly," "air conduction loudspeaker", "air conduction loudspeaker," or "air conduction headset" will be used when describing the air conduction related technology in the present disclosure. This description is only a form of bone conduction application, for the ordinary skilled person in the field, "speaker" or "headset" can also be replaced by other similar words, such as "player", "hearing aid", etc. In fact, the various implementations of the invention can be easily applied to other non-speaker-based hearing devices. For example, for professionals in the field, after understanding the basic principle of the bone conduction speaker, it is possible to make various modifications and changes in the form and details of the specific ways and steps of implementing the bone conduction speaker without departing from this principle, in particular, adding the function of environmental sound pickup and processing to the bone conduction speaker so that the speaker can realize the function of a hearing aid. For example, a sensor, e.g., a microphone can pick up the sound of the user/wearer's surroundings and, under a certain algorithm, transmit the sound processed (or the electrical signal generated) to the bone conduction speaker. That is, the bone conduction speaker can be modified in a certain way to include the function of picking up environmental sound and transmitting the sound to the user/wearer through the bone conduction speaker after certain signal processing, thereby realizing the function of a bone conduction hearing aid. By way of example, the algorithm described herein may include one or a combination of a noise cancellation, an auto gain control, an acoustic feedback suppression, a wide dynamic range compression, an active environment identification, an active anti-noise, a directional processing, a tinnitus processing, a multi-channel wide dynamic range compression, an active whistle suppression, a volume control, etc.

FIG. 1 is a block diagram illustrating a structure of an acoustic input-output device according to some embodiments of the present disclosure. As shown in FIG. 1, an acoustic input-output device 100 may include a loudspeaker assembly 110, a microphone assembly 120, and a fixing assembly 130.

The loudspeaker assembly 110 may be configured to convert a signal containing sound information into a sound signal (also referred to as a voice signal). For example, the loudspeaker assembly 110 may generate a mechanical vibration to transmit sound waves (i.e., sound signals) in response to receiving the signal containing sound information. For ease of description, the mechanical vibration generated by the loudspeaker assembly 110 may be referred to as a first mechanical vibration. In some embodiments, the loudspeaker assembly may include a vibration component and/or a vibration transmission component (e.g., at least a portion of a housing of the acoustic input-output device 100, a vibration transmission sheet) that is connected to the vibration component. Energy conversion occurs when the loudspeaker assembly 110 generates the first mechanical vibration, so that the loudspeaker assembly 110 may achieve a conversion of the signal containing sound information to the mechanical vibration. The process of energy conversion may include a coexistence and a conversion of many different types of energy. For example, an electrical signal (i.e., the signal containing sound information) may be directly converted into the first mechanical vibration by a transducer in the vibration component of the loudspeaker assembly 110, and the first mechanical vibration is transmitted by the vibration transmission component of the loudspeaker assembly 110 to transmit the sound waves. As another example, the sound information may be contained in an optical signal, a specific transducer may achieve the conversion of the optical signal to the vibration signal. Other types of energy that may coexist and be converted during the operation of the transducer include thermal energy, magnetic energy, etc. An energy conversion manner of the transducer may include moving-coil, electrostatic, piezoelectric, moving-iron, pneumatic, electromagnetic, etc.

The loudspeaker assembly 110 may include an air conduction loudspeaker assembly and/or a bone conduction loudspeaker assembly. In some embodiments, the loudspeaker assembly 110 may include a vibration component and a housing. In some embodiments, when the loudspeaker assembly 110 is a bone conduction loudspeaker assembly, the housing of the loudspeaker assembly 110 may be in contact with a certain portion (e.g., face) of a user's body and transmit the first mechanical vibration generated by the vibration component to the auditory nerve through the bone to enable the user to hear the sound, and used as at least a portion of the housing of the acoustic input-output device 100 to accommodate the vibration component and the microphone assembly 120. In some embodiments, when the loudspeaker assembly 110 is an air conduction loudspeaker assembly, the vibration component may cause the air to vibrate to change the density of the air to enable the user to hear the sound, and the housing may be used as at least a portion of the housing of the acoustic input-output device 100 to accommodate the vibration component and the microphone assembly 120. In some embodiments, the loudspeaker assembly 110 and the microphone assembly 120 may be located in different housings.

The vibration component may convert a sound signal into a mechanical vibration signal, thereby generating the first mechanical vibration. In some embodiments, the vibration component (i.e., the transducer device) may include a magnetic circuit assembly. The magnetic circuit assembly may provide a magnetic field. The magnetic field may be configured to convert the signal containing sound information into the mechanical vibration signal. In some embodiments, the sound information may include video and audio files with a particular data format or data or files that may be converted to the sound through a particular way. The signal containing sound information may come from a storage component of the acoustic input-output device 100 or from an information generation, storage, or transmission system other than the acoustic input-output device 100. The signal containing the sound information may include an electrical signal, an optical signal, a magnetic signal, a mechanical signal, or the like, or any combination thereof. The signal containing sound information may come from one or multiple signal sources. The multiple signal sources may be correlated or uncorrelated. In some embodiments, the acoustic input-output device 100 may obtain the signal containing sound information through different ways, and the ways may be wired or wireless, real-time or time-delayed. For example, the acoustic input-output device 100 may receive an electrical signal containing sound information through a wired way or a wireless way or may obtain data directly from a storage medium to generate the sound signal. As another example, the acoustic input-output device 100 may include a component (e.g., an air conduction microphone assembly) with a sound collection capability that picks up the sound in the environment, converts the mechanical vibration of the sound into the electrical signal, which is processed by an amplifier to obtain an electrical signal that meets specific requirements. In some embodiments, the wired connection may include one or a combination of a metallic cable, an optical cable, or a hybrid metallic and optical cable, such as, for example, a coaxial cable, a communication cable, a flexible cable, a spiral cable, a non-metallic sheathed cable, a metal sheathed cable, a multi-core cable, a twisted pair cable, a ribbon cable, a shielded cable, a telecommunication cable, a double stranded cable, a parallel two-core conductor, a twisted pair cable, etc. The examples described above are for convenience of illustration only. The medium of the wired connection may also be of other types, for example, other carriers for the transmission of the electrical or the optical signals, etc.

The wireless connection may include a radio communication, a free-space optical communication, an acoustic communication, and an electromagnetic induction, etc. The radio communication may include IEEE 802.11 series of standards, IEEE 802.15 series of standards (e.g., Bluetooth technology and cellular technology, etc.), a first generation mobile communication technology, a second generation mobile communication technology (e.g., FDMA, TDMA, SDMA, CDMA, and SSMA, etc.), a general packet radio service technology, a third generation mobile communication technology (e.g. CDMA2000, WCDMA, TD-SCDMA, and WiMAX, etc.), a fourth generation mobile communication technology (e.g., TD-LTE and FDD-LTE, etc.), a satellite communication (e.g., GPS technology, etc.), a near field communication (NFC), and other technologies operating in the ISM band (e.g., 2.4 GHz, etc.); the free-space optical communication may include a visible light, an infrared signal, etc.; the acoustic communication may include an acoustic wave, an ultrasonic signal, etc.; the electromagnetic induction may include a near-field communication technology, etc. The examples described above are for convenience of illustration only, and the medium for the wireless connection may also be of other types, e.g., a Z-wave technology, other tolled civilian radio bands, and military radio bands, etc. For example, as some application scenarios of the present disclosure, the bone conduction speaker 100 may obtain the signal containing the sound information from other devices via a Bluetooth™ technology.

The microphone assembly 120 may be configured to pick up the sound signal (also be referred to as the voice signal) and convert the sound signal into the signal containing the sound information (e.g., the electrical signal). For example, the microphone assembly 120 picks up the mechanical vibration of a voice signal source that is generated when the voice signal source provides the voice signal and converts the mechanical vibration into the electrical signal. For ease of description, the mechanical vibration generated when the user provides the voice signal may be referred to as the second mechanical vibration. In some embodiments, the microphone assembly 120 may include one or more microphones. In some embodiments, the microphones may be classified into bone conduction microphones and/or air conduction microphones based on their working principles. For ease of description, in one or more embodiments of the present disclosure, the bone conduction microphone will be used as an example for illustration. It is noted that the bone conduction microphone in the one or more embodiments of the present disclosure may be replaced with the air conduction microphone.

The bone conduction microphone may be configured to collect any mechanical vibration (e.g., the first mechanical vibration and the second mechanical vibration) that is conducted by the user's bones, skin, and other tissues and can be precepted by the bone conduction microphone. The collected mechanical vibration causes internal components (e.g., a diaphragm) of the bone conduction microphone 120 to generate the corresponding mechanical vibration (e.g., a third mechanical vibration and a fourth mechanical vibration), and the mechanical vibration is converted into an electrical signal containing sound information (e.g., a first signal and a second signal). The first signal may be understood as an echo signal generated by the bone conduction microphone. The second signal may be understood as a voice signal generated by the bone conduction microphone. The air conduction microphone may collect an air conduction mechanical vibration (i.e., the sound waves) and convert the mechanical vibration into the signal containing sound information (e.g., an electrical signal). For example, if the loudspeaker assembly 110 includes an air conduction loudspeaker, the air conduction microphone may receive the echo signal transmitted (by air conduction) by the air conduction loudspeaker. As another example, if the loudspeaker assembly 110 includes a bone conduction loudspeaker, the air conduction microphone may receive both the mechanical vibrations transmitted by the bone conduction loudspeaker and the echo signal transmitted by the bone conduction loudspeaker through air conduction. In some embodiments, the microphone assembly 120 may include the microphone diaphragm and other electronic components. After being transmitted to the microphone diaphragm, the mechanical vibration of the voice signal source may cause the corresponding mechanical vibration of the microphone diaphragm, and the electronic components may convert the mechanical vibration into the signal containing sound information (e.g., the electrical signal). In some embodiments, the microphone assembly 120 may include, but is not limited to, a ribbon microphone, a microelectromechanical systems (MEMS) microphone, a dynamic microphone, a piezoelectric microphone, a condenser microphone, a carbon microphone, an analog microphone, a digital microphone, or the like, or any combination thereof. For example, the bone conduction microphone may include an omnidirectional microphone, a unidirectional microphone, a bidirectional microphone, a cardioid microphone, or the like, or any combination thereof.

In some embodiments, when the loudspeaker assembly 110 and the microphone assembly 120 operate simultaneously, the microphone assembly 120 may percept the first mechanical vibration generated by the loudspeaker assembly 110 and the second mechanical vibration that is generated by the voice signal source. In response to the first mechanical vibration, the microphone assembly 120 may generate the third mechanical vibration and convert the third mechanical vibration into the first signal. In response to the second mechanical vibration, the microphone assembly 120 may generate the fourth mechanical vibration and convert the fourth mechanical vibration into the second signal. In some embodiments, the loudspeaker assembly 110 may be referred to as an echo signal source. In some embodiments, when the loudspeaker assembly 110 and the microphone assembly 120 operate simultaneously, in a specific frequency range, a ratio of an intensity of the first mechanical vibration to an intensity of the first signal is greater than a ratio of an intensity of the second mechanical vibration to an intensity of the second signal. The frequency range may include 200 Hz to 10 kHz, 200 Hz to 5000 Hz, 200 Hz to 2000 Hz, or 200 Hz to 1000 Hz, etc.

The fixing assembly 130 may support the loudspeaker assembly 110 and the microphone assembly 120. In some embodiments, the fixing assembly 130 may include an arc-shaped elastic member capable of forming a force of rebounding toward the middle of the arc so as to be in stable contact with the human skull. In some embodiments, the fixing assembly 130 may include one or more connectors. The one or more connectors may connect the loudspeaker assembly 110 and/or the microphone assembly 120. In some embodiments, the fixing assembly 130 may be worn binaurally. For example, both ends of the fixing assembly 130 may be fixedly connected to two sets of the loudspeaker assemblies 110, respectively. When the user wears the acoustic input-output device 100, the fixing assembly 130 may hold the two sets of the loudspeaker assemblies 110 near the user's left and right ears, respectively. In some embodiments, the fixing assembly 130 may be worn monaurally. For example, the fixing assembly 130 may be fixedly connected to only one set of the loudspeaker assemblies 110. When the user wears the acoustic input-output device 100, the fixing assembly 130 may hold the loudspeaker assembly 110 near the user's ear on one side. In some embodiments, the fixing assembly 130 may be glasses (e.g., sunglasses, augmented reality glasses, virtual reality glasses), a helmet, a hairband, or the like, or any combination thereof, which is not limited herein.

The above description of the structure of the acoustic input-output device is merely a specific example and should not be considered as the only feasible embodiment. Obviously, for those skilled in the art, after understanding the basic principle of the acoustic input-output device 100, various amendments and variations in form and detail may be made to the specific manner and steps for implementing the acoustic input-output device 100 without departing from the principle, but these amendments and variations remain within the scope of the above description. For example, the acoustic input-output device 100 may include one or more processors, and the processors may perform one or more sound signal processing algorithms. The sound signal processing algorithms may correct or enhance the sound signal. For example, the sound signal is subjected to a noise reduction, an acoustic feedback suppression, a wide dynamic range compression, an automatic gain control, an active ambient recognition, ab active anti-noise, a directional processing, a tinnitus processing, a multi-channel wide dynamic range compression, an active whistle suppression, a volume control, or other similar, or any combination thereof, and these amendments and variations remain within the scope of protection of the claims of the present disclosure. As another example, the acoustic input-output device 100 may include one or more sensors, such as a temperature sensor, a humidity sensor, a speed sensor, a displacement sensor, etc. The sensor may collect user information or environmental information.

Figure 2A:
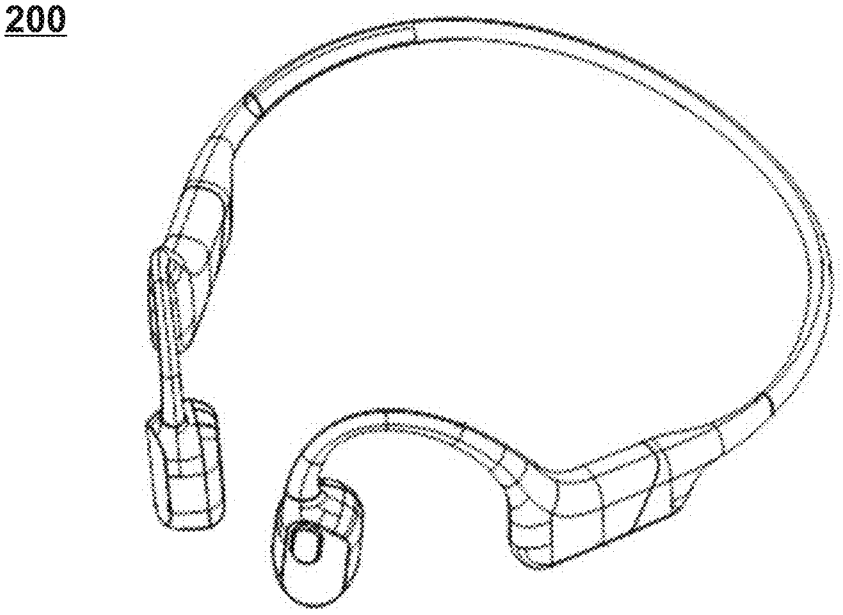
FIG. 2A and FIG. 2B are schematic diagrams each of which illustrates a structure of an acoustic input-output device according to some embodiments of the present disclosure.
Figure 2B:
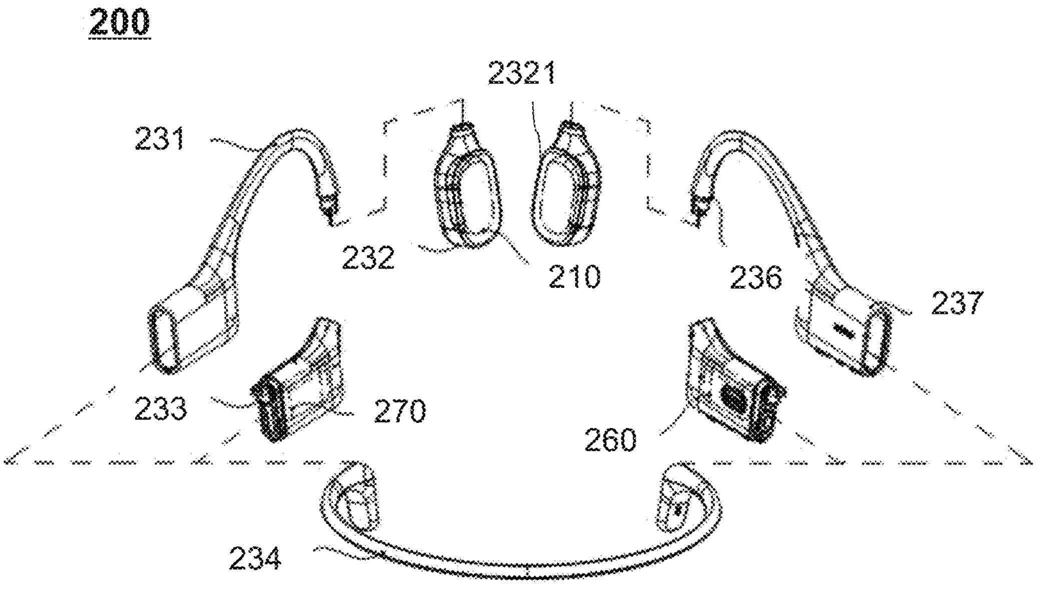

FIG. 2A and FIG. 2B are schematic diagrams each of which illustrates a structure of an acoustic input-output device according to some embodiments of the present disclosure. As shown in FIG. 2A and FIG. 2B, in some embodiments, an acoustic input-output device 200 may be an ear-clip headset, and the ear-clip headset may include a headset core 210, a fixing assembly 230, a control circuit 240, and a battery 250. The headset core 210 may include a loudspeaker assembly (not shown) and a microphone assembly (not shown). The fixing assembly 230 may include an ear-hook 231, a headset housing 232, a circuit housing 233, and a rear-hook 234. The headset housing 232 and the circuit housing 233 may be respectively arranged at both ends of the ear-hook 231, and the rear-hook 234 may be arranged at one end of the circuit housing 233 away from the ear-hook 231. The headset housing 232 may be configured to accommodate different headset cores. The circuit housing 233 may be configured to accommodate the control circuitry 260 and the battery 270. Both ends of the rear-hook 234 may be connected to the corresponding circuit housing 233 respectively. The ear-hook 231 may refer to a structure that suspends the ear-clip headset over the user's ear and fixes the headset housing 232 and the headset core 210 to a predetermined location relative to the user's ear when the user wears the acoustic input-output device 200.

In some embodiments, the ear-hook 231 may include an elastic metal wire. The elastic metal wire may be configured to keep the ear-hook 231 in a shape that matches the user's ear, and the elastic metal wire has a certain degree of elasticity, so that when the user wears the ear-clip headset, the elastic metal wire may be elastically deformed according to the user's ear shape and head shape to adapt to users with different ear shapes and head shapes. In some embodiments, the elastic metal wire may be made of memory alloy with good deformation recovery ability. Even if the ear-hook 231 is deformed by an external force, when the external force is removed, the ear-hook 231 may return to its original shape, thereby extending a service life of the ear-clip headset. In some embodiments, the elastic metal wire may be made of non-memory alloy. Wires may be provided in the elastic metal wire to establish electrical connections between the headset core 210 and other components (e.g., the control circuitry 260, the battery 270, etc.), so as to provide power and data transmission for the headset core 210. In some embodiments, the ear-hook 231 may include a protective sleeve 236 and a housing protector 237 integrally formed with the protective sleeve 236.

In some embodiments, the headset housing 232 may be configured to accommodate the headset core 210. The headset core 210 may include one or more loudspeaker assemblies and/or one or more microphone assemblies. The one or more loudspeaker assemblies may include a bone conduction loudspeaker assembly, an air conduction loudspeaker assembly, etc. The one or more microphone assemblies may include a bone conduction microphone assembly, an air conduction microphone assembly, etc. The structure and arrangement of the one or more loudspeaker assemblies and the one or more microphone assemblies may be found elsewhere in the present disclosure, e.g., FIGS. 3-15 and the detailed descriptions thereof. A count of the headset core 210 or the headset housing 232 may be two, which may respectively correspond to the left and right ear of the user.

In some embodiments, the ear-hook 231 and the headset housing 232 may be molded separately and further assembled together, rather than directly molding the two together.

In some embodiments, the headset housing 232 may be provided with a contact surface 2321. The contact surface 2321 may be in contact with the skin of the user. When the ear-clip headset is used, the sound waves generated by one or more bone conduction loudspeakers of the headset core 210 may be transmitted outside (e.g., the eardrum of the user) the headset housing 232 through the contact surface 2321. In some embodiments, a material and thickness of the contact surface 2321 may affect the transmission of the bone conduction sound waves to the user, thereby affecting the sound quality. For example, if an elasticity of the material of the contact surface 2321 is relatively large, the transmission of bone conduction sound waves in a low frequency range may be better than the transmission of bone conduction sound waves in a high frequency range. If the elasticity of the material of the contact surface 2321 is relatively small, the transmission of the bone conduction sound waves in the high frequency range may be better than the transmission of bone conduction sound waves in the low frequency range. It should be noted that the headset housing 232 in the embodiments and the housing in other embodiments of the present disclosure refer to the component of the acoustic input-output device 200 in contact with the user.

Figure 3:
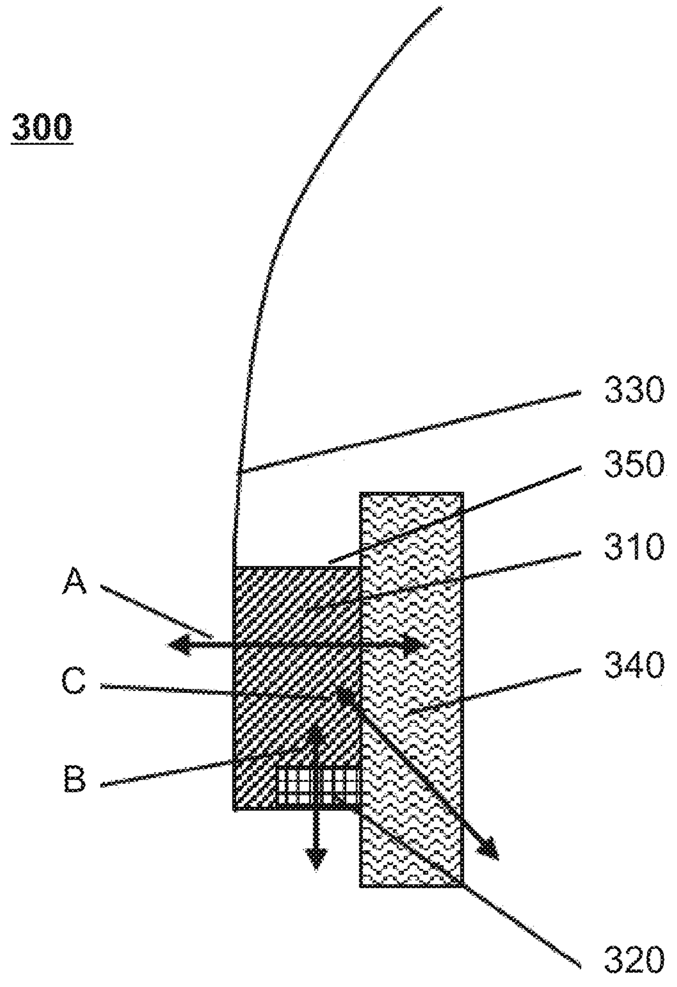
FIG. 3 is a schematic diagram illustrating a cross-section of a portion of a structure of an acoustic input-output device according to some embodiments of the present disclosure.

FIG. 3 is a schematic diagram illustrating a cross-section of a portion of a structure of an acoustic input-output device according to some embodiments of the present disclosure. As shown in FIG. 3, in some embodiments, the acoustic input-output device 300 may include a loudspeaker assembly 310 and a bone conduction microphone 320. The loudspeaker assembly 310 is configured to transmit sound waves by generating a first mechanical vibration. The bone conduction microphone 320 is configured to receive a second mechanical vibration of a voice signal source that is generated when the voice signal source provides a voice signal. In some embodiments, the acoustic input-output device 300 may further include a fixing assembly 330. As shown in FIG. 3, the fixing assembly 330 is fixedly connected to the loudspeaker assembly 310, and when the user wears the acoustic input-output device 300, the fixing assembly 330 maintains a contact between the loudspeaker assembly 310, the bone conduction microphone 320, and the user's face 340. In some embodiments, when the bone conduction microphone 320 and the loudspeaker assembly 310 operate simultaneously, the bone conduction microphone 320 may generate the third mechanical vibration and the fourth mechanical vibration in response to the first mechanical vibration and the second mechanical vibration, respectively, and convert the third mechanical vibration and the fourth mechanical vibration into the first signal and the second signal, respectively. In some embodiments, in a specific frequency range, a ratio of an intensity of the first mechanical vibration to an intensity of the first signal is greater than a ratio of an intensity of the second mechanical vibration to an intensity of the second signal. As described herein, the third mechanical vibration may also be referred to as an echo signal received by the bone conduction microphone 320. The fourth mechanical vibration may also be referred to as a voice signal received by the bone conduction microphone 320. In some embodiments, the frequency range may include a range of 200 Hz to 10 kHz. In some embodiments, the frequency range may include a range of 200 Hz to 9000 Hz. In some embodiments, the frequency range may include a range of 200 Hz to 8000 Hz. In some embodiments, the frequency range may include a range of 200 Hz to 6000 Hz. In some embodiments, the frequency range may include a range of 200 Hz to 5000 Hz.

The loudspeaker assembly 310 may transmit the sound waves by generating the first mechanical vibration to cause the user to hear the sound. A sound wave conduction way of the loudspeaker assembly 310 includes air conduction and bone conduction. The air conduction corresponds to the air conduction loudspeaker assembly. The air conduction loudspeaker assembly transmits the sound waves in a form of waves through the air, and the sound waves are transmitted to the auditory nerve through the user's eardrum-auditory ossicles-cochlea, so that the user can hear the sound. The bone conduction corresponds to the bone conduction loudspeaker assembly. The bone conduction loudspeaker assembly transmits the mechanical vibration to the skins and bones of the user's face 340 by contacting the user's face 340 (for example, the housing 350 of the bone conduction loudspeaker assembly is in contact with the user's face 340), and further transmits the mechanical vibration to the auditory nerve through the skins and bones, so that the user can hear the sound. Whether the bone conduction loudspeaker assembly or the air conduction loudspeaker assembly, the bone conduction microphone 320 is directly or indirectly connected to the loudspeaker assembly 310. Specifically, when the loudspeaker assembly 310 is a bone conduction loudspeaker assembly, the housing 350 is one of the vibration transmission components of the bone conduction loudspeaker assembly, the vibration component in the bone conduction loudspeaker assembly needs to be directly or indirectly connected to the housing 350 to transmit the vibration to the skin and the bone of the user. The bone conduction microphone 320 needs to be directly or indirectly connected to the housing 350 to collect the vibration that is generated when the user is speaking. The sound waves transmitted by the bone conduction loudspeaker cause the mechanical vibration of the housing 350, the housing 350 transmits the mechanical vibration to the bone conduction microphone 320. After receiving the mechanical vibration, the bone conduction microphone 320 generates the corresponding third mechanical vibration and generates the first signal containing sound information based on the third mechanical vibration. When the loudspeaker assembly 310 is an air conduction loudspeaker assembly, the housing 350 is configured to accommodate the air conduction loudspeaker assembly and the bone conduction microphone 320, which is equivalent to the housing of the acoustic input-output device 300, and the vibration component in the air conduction loudspeaker assembly may be directly or indirectly connected to the housing 350 to fix the air conduction loudspeaker assembly. In summary, the bone conduction microphone 320 needs to be directly or indirectly connected to the housing 350 to collect the vibration that is generated when the user is speaking. The sound waves transmitted by the air conduction loudspeaker cause the mechanical vibration of the housing 350, the housing 350 transmits the mechanical vibration to the bone conduction microphone 320. After receiving the mechanical vibration, The bone conduction microphone 320 generates the corresponding third mechanical vibration and generates the first signal containing sound information based on the third mechanical vibration.

Therefore, at least a portion of the first mechanical vibration that is generated by the loudspeaker assembly 310 is transmitted to the bone conduction microphone 320 to cause the bone conduction microphone 320 to generate the third mechanical vibration. In addition to the first mechanical vibration transmitted by the loudspeaker assembly 310, the bone conduction microphone 320 may be in contact with the skin of the user's face 340 to receive the second mechanical vibration (e.g., the vibration of the skin and bone) that is generated when the user speaks to cause the bone conduction microphone 320 to generate the fourth mechanical vibration.

When the bone conduction microphone 320 and the loudspeaker assembly 310 operate simultaneously, for example, the bone conduction microphone 320 receives a voice signal (e.g., by picking up the vibration of the skin and other positions when the user speaks) while the loudspeaker assembly 310 transmits a voice signal (e.g., music) through vibration, the bone conduction microphone 320 receives both the first mechanical vibration and the second mechanical vibration. A microphone diaphragm of the bone conduction microphone 320 (not shown) generates the third mechanical vibration and the fourth mechanical vibration corresponding to the first mechanical vibration and the second mechanical vibration, respectively, and converts the third mechanical vibration and the fourth mechanical vibration into the first signal and the second signal, respectively. When the microphone diaphragm generates the third mechanical vibration in response to the picked up first mechanical vibration, the bone conduction microphone 320 receives the voice information transmitted by the first mechanical vibration other than the voice information transmitted by the second mechanical vibration, thereby affecting the quality of the sound signal picked up by the microphone. For ease of description, the signal transmitted by the first mechanical vibration may be referred to as an echo signal (or a sub-voice signal), and the component (e.g., the loudspeaker assembly 310, the housing 350) that generates and transmits the first mechanical vibration may be referred to as an echo signal source (or a sub-voice signal source). The second mechanical vibration may be referred to as a voice signal (or a primary voice signal), and the component (e.g., the user's vocal cord, nasal cavity, mouth, etc.) that generates and transmits the second mechanical vibration may be referred to as a voice signal source (or a primary voice signal source). Vibration directions of the voice signal source, the echo signal source, and the bone conduction microphone are illustrated in FIG. 3, wherein a direction indicated by an arrow A is a direction of the first mechanical vibration, i.e., the vibration direction of the echo signal source, a direction indicated by an arrow B is the vibration direction of the bone conduction microphone, i.e., direction of the third mechanical vibration and the fourth mechanical vibration, and a direction indicated by an arrow C is a direction of the second mechanical vibration, i.e., the vibration direction of the voice signal source.

For the above reasons, an intensity of the echo signal (i.e., the intensity of the first signal) generated by the bone conduction microphone 320 may be reduced by performing some design on the acoustic input-output device 300. Further, while reducing the intensity of the echo signal generated by the bone conduction microphone 320, the intensity of the voice signal generated by the bone conduction microphone 320 (i.e., the intensity of the second signal) may be increased to achieve a purpose of reducing the intensity of the first signal and increasing the intensity of the second signal, such that the ratio of the intensity of the first mechanical vibration to the intensity of the first signal is greater than the ratio of the intensity of the second mechanical vibration to the intensity of the second signal, thereby improving the quality of the sound signal generated by the bone conduction microphone.

Figure 4:
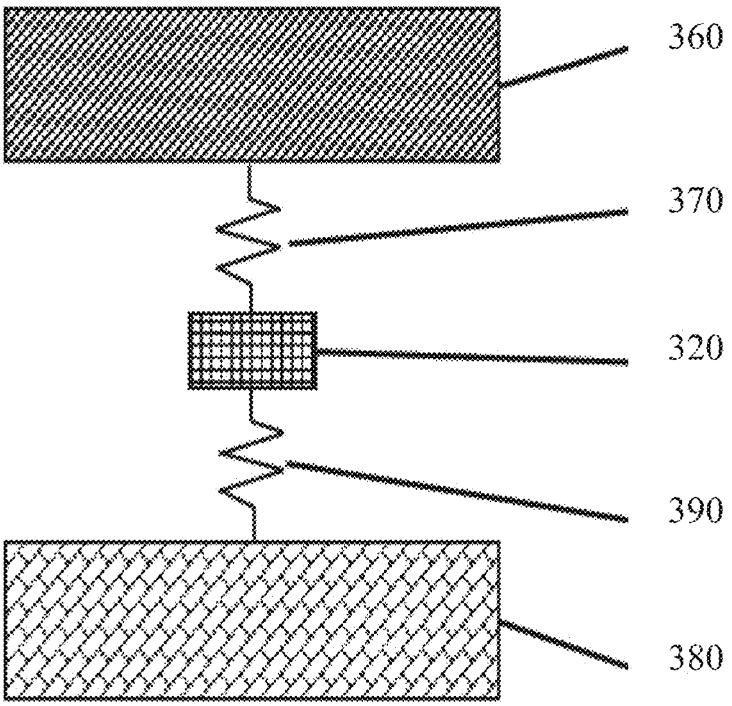
FIG. 4 is a schematic diagram illustrating a vibration transmission model of an acoustic input-output device according to some embodiments of the present disclosure.

FIG. 4 is a schematic diagram illustrating a vibration transmission model of an acoustic input-output device according to some embodiments of the present disclosure. As shown in FIG. 3 and FIG. 4, when the bone conduction microphone 320 and the loudspeaker assembly 310 in the acoustic input-output device 300 operate simultaneously, a mechanical vibration transmission model of the acoustic input-output device 300 may be equated to the model shown in FIG. 4. Specifically, an intensity of a mechanical vibration (i.e., the second mechanical vibration) of a voice signal source 360 (e.g., the user's bone or vocal cord) is L1. An intensity of a mechanical vibration (i.e., the first mechanical vibration) of an echo signal source 380 (e.g., the loudspeaker assembly 310) is L2. There may be a first elastic connection 370 between the bone conduction microphone 320 and the voice signal source 360, and an elasticity coefficient of the first elastic connection 370 is k1. There may be a second elastic connection 390 between the bone conduction microphone 320 and the echo signal source 380, and an elasticity coefficient of the second elastic connection 390 is k2. A mass of the bone conduction microphone 320 is m. The first elastic connection 370 between the voice signal source 360 and the bone conduction microphone 320 may include a contact component (e.g., a vibration transmission layer, a metal sheet, a portion of the housing 350, etc.) of the bone conduction microphone 320 and the user's face 340, the user's skin, etc. A second elastic connection 390 between the bone conduction microphone 320 and the echo signal source 380 is a portion of the acoustic input-output device 300. For example, the bone conduction microphone 320 and the echo signal source 380 may both be physically connected to the housing 350, and the second elastic connection 390 may include the housing 350. As another example, the bone conduction microphone 320 and the echo signal source 380 may respectively be physically connected to the housing 350 through a connector, and the second elastic connection 390 may include the housing 350 and the connector. In the embodiments shown in FIG. 4, it may be assumed that a vibration direction of the voice signal source 360 is parallel to a vibration direction of the bone conduction microphone 320, and a vibration direction of the echo signal source 380 is parallel to the vibration direction of the bone conduction microphone 320, and the bone conduction microphone may receive a vibration of the voice signal source 360 and a vibration of the echo signal source 380 to the maximum extent. The vibration direction of the bone conduction microphone 320 may be understood as a vibration direction of the microphone diaphragm.

According to FIG. 4, an intensity L of the mechanical vibration received by the bone conduction microphone 320 may be obtained as follows:

$$L = \frac{k1}{k1 + k2 - m\omega^2} L1 + \frac{k2}{k1 + k2 - m\omega^2} L2, \quad (1)$$

where L1 refers to the intensity of the second mechanical vibration received by the bone conduction microphone 320, L2 refers to the intensity of the received first mechanical vibration, and m refers to the mass of the bone conduction microphone 320. ω refers to an angle frequency of the voice signal and/or the echo signal.

$$\frac{k1}{k1+k2-m\omega^2}$$

may indicate an effect of L1 (i.e., the second mechanical vibration) on L.

$$\frac{k2}{k1+k2-m\omega^2}$$

may indicate an effect of L2 (i.e., the first mechanical vibration) on L.

Therefore, the greater the elasticity coefficient k1 of the first elastic connection 370, the greater the effect of the intensity L1 of the vibration of the voice signal source on the intensity L of the mechanical vibration received by the bone conduction microphone 320. The smaller the elasticity coefficient k2 of the second elastic connection 390, the smaller the elasticity coefficient of the second elastic connection 390, the smaller the effect of the intensity L2 of the mechanical vibration of the echo signal source on the intensity L of the mechanical vibration received by the bone conduction microphone 320, the smaller the echo signal received by the bone conduction microphone 320.

According to equation (1), it may be learned that to reduce the echo signal received by the bone conduction microphone 320, the acoustic input-output device may be designed in a plurality of ways, for example, by increasing as much as possible L1 and/or k1, and minimizing L2 and/or k2 to increase the effect of L1 on L and reduce the effect of L2 on L, thereby improving the quality of the sound signal generated by the bone conduction microphone.

Figure 5:
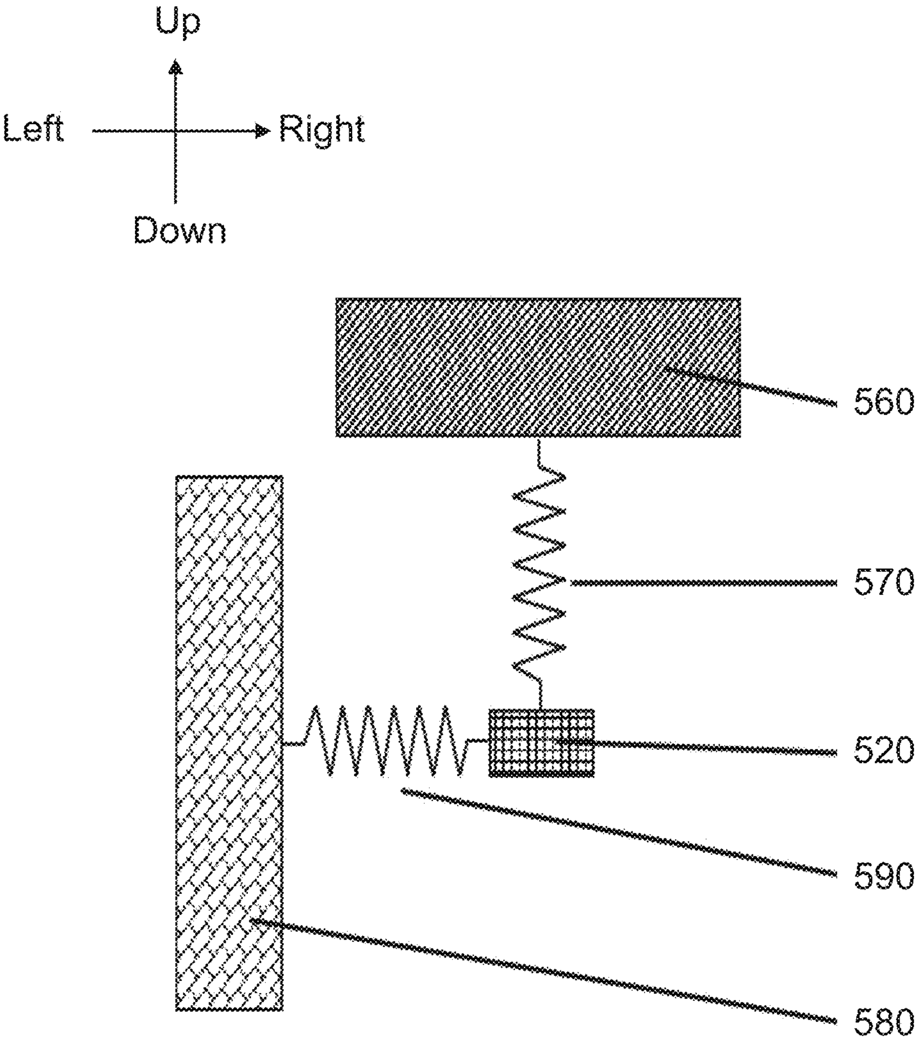
FIG. 5 is a schematic diagram illustrating a vibration transmission model of an acoustic input-output device according to some embodiments of the present disclosure.

FIG. 5 is a schematic diagram illustrating a vibration transmission model of an acoustic input-output device according to some embodiments of the present disclosure. As shown in FIG. 5, in some embodiments, a bone conduction microphone 520 may be a single-axis bone conduction microphone. A microphone diaphragm of the single-axis bone conduction microphone may produce vibration in only one direction, i.e., the microphone diaphragm may only convert the mechanical vibration in that direction into the electrical signal (e.g., the first signal). For example, taking FIG. 5 as an example, a vibration direction of the bone conduction microphone 520 is up and down, and when a direction of a mechanical vibration is parallel to the vibration direction of the bone conduction microphone 520 (i.e., both are in the up and down direction), the microphone diaphragm may convert received mechanical vibration into an electrical signal (e.g., the first signal and the second signal) to the maximum extent. Converting the received mechanical vibration into the electrical signal to the maximum extent is understood as excluding the loss caused by resistance and other effects (e.g., the mechanical vibration is partially lost when being transmitted through a first elastic connection 570 and a second elastic connection 590), almost all mechanical vibration may be received by the microphone diaphragm and converted into the electrical signal. When the direction of the mechanical vibration is perpendicular to the vibration direction of the bone conduction microphone 520 (i.e., a left and right direction), only a small portion of the received mechanical vibration may be converted into the electrical signal by the microphone diaphragm, so that an intensity of the electrical signal is the smallest, that is, when the vibration direction of the bone conduction microphone 520 is perpendicular to the direction of mechanical vibration, the intensity of the electrical signal generated by the bone conduction microphone 520 is the smallest, and the intensity of the sound signal generated by the bone conduction microphone 520 is the smallest.

According to the above principle, in some embodiments, an installation location of the bone conduction microphone 520 may be designed, such that the vibration direction of the bone conduction microphone 520 and a vibration direction (i.e., the direction of the first mechanical vibration) of an echo signal source 580 (e.g., the loudspeaker assembly 310 shown in FIG. 3) are within a specific angle range to reduce the intensity of the first signal generated by the bone conduction microphone 520, i.e. reduce the intensity of the echo signal generated by the bone conduction microphone 520. Further, in some embodiments, the vibration direction of the bone conduction microphone 520 and a vibration direction of an echo signal source 560 (e.g., the user's face 340 shown in FIG. 3) are within a specific angle range to increase the intensity of the second signal generated by the bone conduction microphone 520, i.e., increase the intensity of the voice signal generated by the bone conduction microphone 520.

Figure 6:
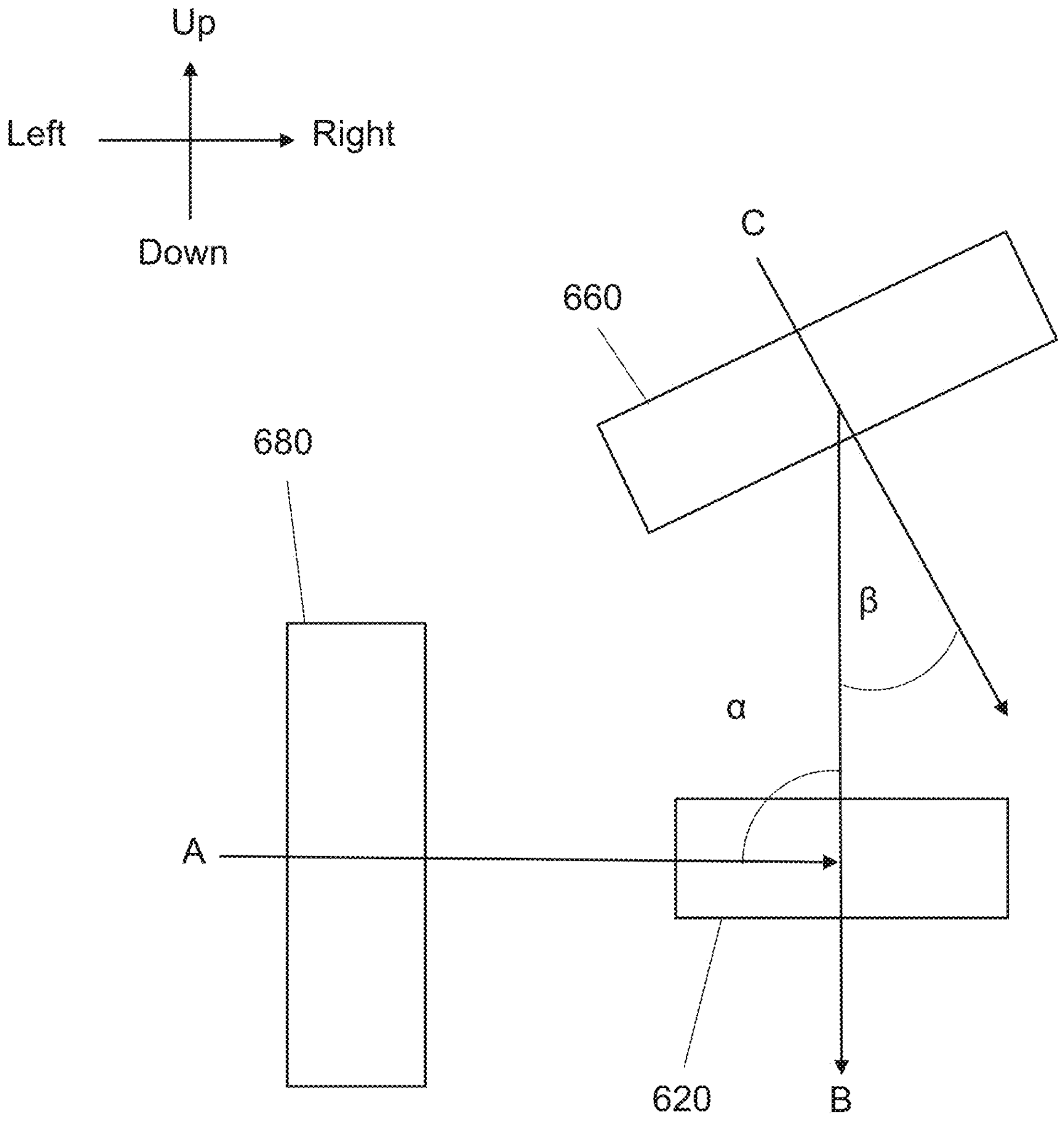
FIG. 6 is a schematic diagram illustrating a vibration transmission model of an acoustic input-output device according to some embodiments of the present disclosure.

FIG. 6 is a schematic diagram illustrating a vibration transmission model of an acoustic input-output device according to some embodiments of the present disclosure. As shown in FIG. 6, in some embodiments, an angle formed by a vibration direction of a bone conduction microphone 620 and a vibration direction of an echo signal source 680 (e.g., the loudspeaker assembly 310 shown in FIG. 3) may be a first angle α. In some embodiments, the first angle α may be within an angle range of 20 degrees to 90 degrees. In some embodiments, the first angle α may be in an angle range of 45 degrees to 90 degrees. In some embodiments, the first angle α may be within an angle range of 60 degrees to 90 degrees. In some embodiments, the first angle α may be within an angle range of 75 degrees to 90 degrees. In some embodiments, the first angle α may be 90 degrees. In the embodiments, within the range of 20 degrees to 90 degrees, the larger the first angle α, the closer the vibration direction of the microphone diaphragm is to being perpendicular to the vibration direction of the echo signal source 680, and the smaller the intensity of the first signal converted by the microphone diaphragm. When the first angle α is 90 degrees, the intensity of the first signal converted by the microphone diaphragm is the smallest, i.e., the intensity of the echo signal generated by the bone conduction microphone 620 is the smallest.

In some embodiments, according to equation (1), it may be known that the greater the effect of an intensity L1 of the vibration of a voice signal source 660 on an intensity L of the mechanical vibration received by the bone conduction microphone 620, i.e., the greater the intensity of the vibration of the voice signal source 660 received by the bone conduction microphone 620, which is equivalent to reducing an effect of an intensity L2 of the vibration of the voice signal source 680 on a voice signal L generated by the bone conduction microphone 620. In some embodiments, to increase the effect of the intensity L1 of the mechanical vibration of the voice signal source 660 on the voice signal L generated by the bone conduction microphone 620, an angle between a vibration direction of the bone conduction microphone 620 and a vibration direction of the voice signal source 660 may be designed to be within a specific range. An angle between the vibration direction of the bone conduction microphone 620 and the vibration direction of the voice signal source 660 may be a second angle β. In some embodiments, the second angle β may be within an angle range of 0 degrees to 85 degrees. In some embodiments, the second angle β may be within an angle range of 0 degrees to 75 degrees. In some embodiments, the second angle β may be within an angle range of 0 degrees to 60 degrees. In some embodiments, the second angle β may be within an angle range of 0 degrees to 45 degrees. In some embodiments, the second angle β may be within an angle range of 0 degrees to 30 degrees. In some embodiments, the second angle β may be within an angle range of 0 degrees to 15 degrees. In some embodiments, the second angle β may be within an angle range of 0 degrees to 5 degrees. In some embodiments, the second angle β may be 0 degrees, i.e., the vibration direction of the bone conduction microphone 620 is parallel to the vibration direction of the voice signal source 660. In the embodiments, within the range of 0 degrees to 90 degrees, the smaller the second angle β, the closer the vibration direction of the microphone diaphragm is to be parallel to the vibration direction of the voice signal source 660, and the greater the intensity of the second signal converted by the microphone diaphragm. When the second angle β is 0 degrees, the intensity of the first signal converted by the microphone diaphragm is the greatest, and at this time the intensity of the second signal generated by the bone conduction microphone 620 is the greatest, i.e., the intensity of the generated voice signal is the greatest. As used herein, an angle between two directions refers to a smallest positive angle formed by the intersection of straight lines where the two directions are located.

It is noted that a scheme of controlling the first angle α in a set angle range and a scheme of controlling the second angle β in a set angle range may be combined. In some embodiments, the first angle α may be set to 90 degrees, and the second angle β may be set to 30 degrees. In some embodiments, the first angle α may be set to 90 degrees and the second angle β to 45 degrees. In some embodiments, the first angle α may be set to 90 degrees, and the second angle β may be set to 60 degrees. In some embodiments, the first angle α may be set to 45 degrees, and the second angle β may be set to 30 degrees. In some embodiments, the first angle α may be set to 90 degrees, and the second angle β is set to 15 degrees. As shown in FIG. 6 and FIG. 5, When the first angle α is set to 90 degrees and the second angle β is set to 0 degrees. In the embodiments, the bone conduction microphone 620 may convert the vibration generated by the voice signal source 660 into the second signal to the maximum extent, and the intensity of the generated first signal is the smallest, thereby improving the quality of the sound signal generated by the bone conduction microphone 620.

Figure 8:
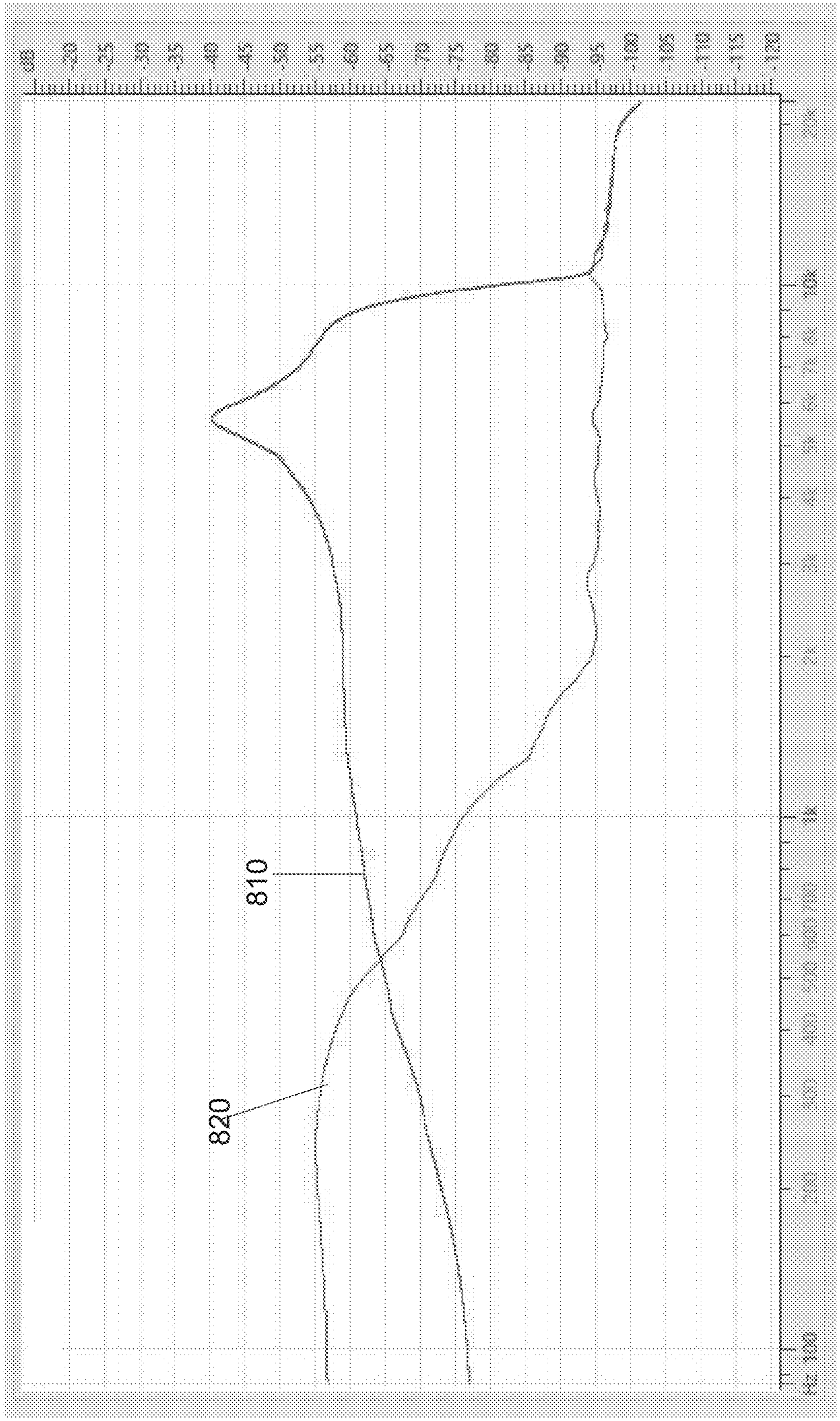
FIG. 8 is a schematic diagram illustrating intensity curves of a second signal and a first signal according to some embodiments of the present disclosure.

FIG. 8 is a schematic diagram illustrating intensity curves of a second signal and a first signal according to some embodiments of the present disclosure. FIG. 8 illustrates an intensity curve 810 of the first signal converted by the mechanical vibration (i.e., the first mechanical vibration) that is generated based on the echo signal source 380 in FIG. 4 of the bone conduction microphone and an intensity curve 820 of the second signal converted by the mechanical vibration (i.e., the second mechanical vibration) that is generated based on the voice signal source 360 in FIG. 4 of the bone conduction microphone. In FIG. 8, the horizontal axis is frequency and the vertical axis is sound intensity. In some embodiments, the intensity curves of the first signal and the second signal shown in FIG. 8 are obtained in a situation where the first angle α is 0 degrees and the second angle β is also 0 degrees. According to FIG. 3, FIG. 4, and FIG. 8, it may be learned that within a frequency range of about 0 to 500 Hz, the intensity of the first signal generated by the bone conduction microphone 320 is less than the intensity of the second signal. When the frequency exceeds 500 Hz, for example, within a frequency range of 500 Hz to 10,000 Hz, the intensity of the first signal generated by the bone conduction microphone 320 is greater than the intensity of the second signal, and the echo signal generated by the bone conduction microphone 320 is larger. Therefore, the intensity of the echo signal generated by the bone conduction microphone 320 may be reduced by designing installation locations of the bone conduction microphone 320 and the loudspeaker assembly 310.

Figure 9:
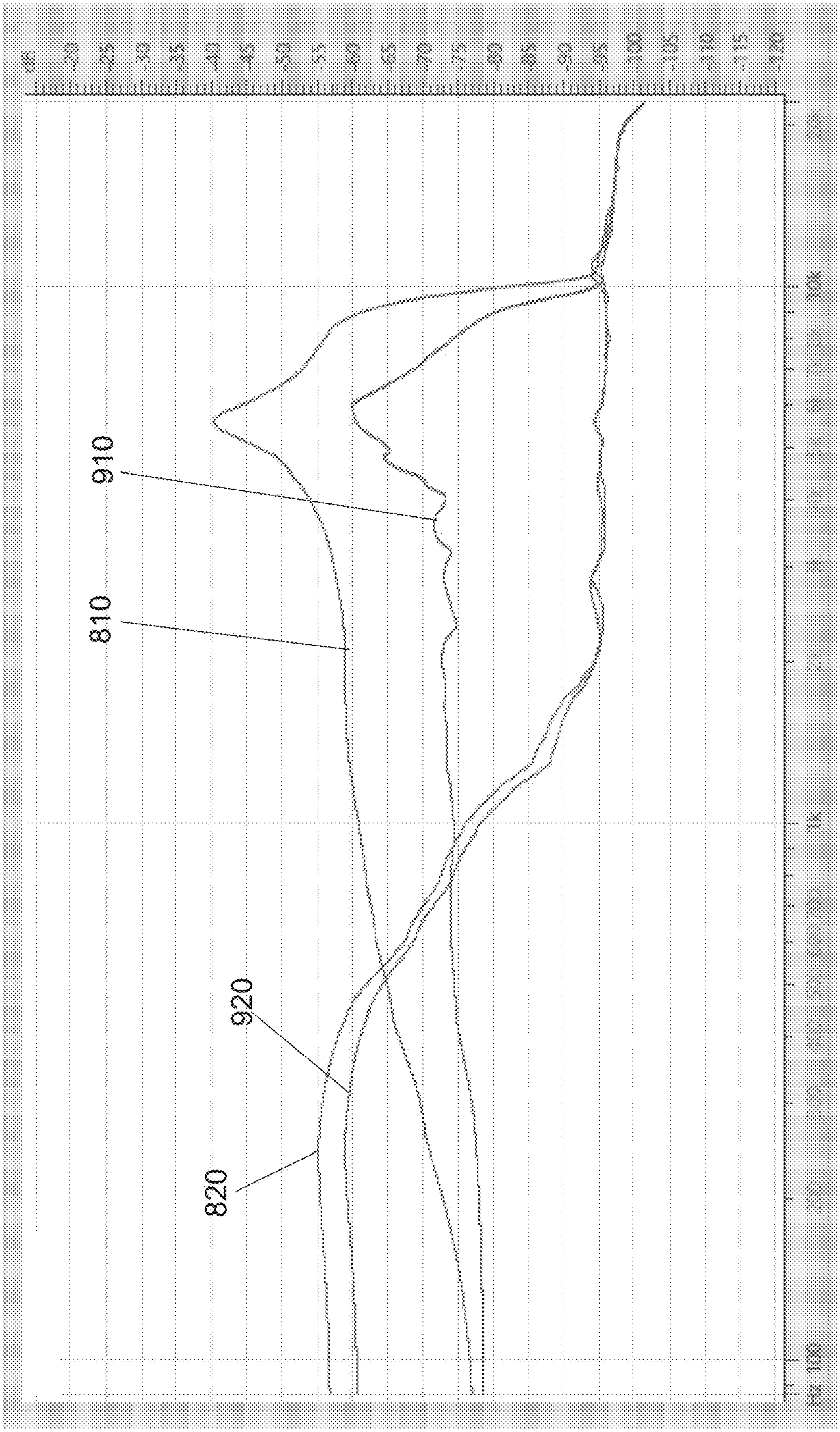
FIG. 9 is a schematic diagram illustrating intensity curves of a second signal and a first signal according to some embodiments of the present disclosure.

For example, FIG. 9 is a schematic diagram illustrating intensity curves of a second signal and a first signal according to some embodiments of the present disclosure. As shown in FIG. 9, in the embodiments, locations of the bone conduction microphone 620 and the echo signal source 680 (e.g., the loudspeaker assembly 310 shown in FIG. 3) are designed in a specific manner, such that the first angle α is 90 degrees and the second angle β is 60 degrees. According to the intensity curves 810 and 910 of the first signal and the intensity curves 820 and 920 of the second signal, it may be learned that by the above design (i.e., the adjustment of the first angle α and the second angle β), the intensity of the first signal generated by the bone conduction microphone 620 is significantly reduced (as shown in FIG. 9). At the same time, the weakening of the intensity of the second signal generated by the bone conduction microphone 620 caused by the above design is little or almost negligible. The intensity reduction of the second signal generated by the bone conduction microphone 620 is significantly smaller than the intensity reduction of the first signal, which makes a ratio of the intensity of the first mechanical vibration to the intensity of the first signal to be larger than a ratio of the intensity of the second mechanical vibration to the intensity of the second signal. In some embodiments, by the above design, within a frequency range from 0 to 800 Hz, the intensity of the first signal generated by the bone conduction microphone 620 is smaller. Compared with FIG. 8, within a wider low frequency range, the intensity of the first signal generated by the bone conduction microphone 620 is smaller, i.e., the intensity of the echo signal generated by the bone conduction microphone 620 is smaller, thereby allowing the user to hear a clearer voice signal, and effectively improving the sound quality and the service experience of the user.

In some embodiments, by designing the locations of the bone conduction microphone 620 and the echo signal source 680 (e.g., the loudspeaker assembly 310), the intensity reduction of the second signal is significantly less than the intensity reduction of the first signal, accordingly, a ratio of the intensity of the second signal to the intensity of the first signal to be greater than a threshold, thereby increasing a proportion of the voice signal in the sound signal generated by the bone conduction microphone and making the voice signal cleaner and the experience of the user better. In some embodiments, the ratio of the intensity of the second signal to the intensity of the first signal may be greater than ¼. In some embodiments, the ratio of the intensity of the second signal to the intensity of the first signal may be greater than ⅓. In some embodiments, the ratio of the intensity of the second signal to the intensity of the first signal may be greater than ½. In some embodiments, the ratio of the intensity of the second signal to the intensity of the first signal may be greater than ⅔.

It should be noted that the scheme, in one or more above-mentioned embodiments, of increasing the intensity of the voice signal received by the microphone assembly (e.g., the microphone assembly 320 shown in FIG. 3) and reducing the intensity of the echo signal by adjusting the first angle and the second angle may also be applied to the air conduction microphone.

In some embodiments, the single-axis bone conduction microphone is merely an example, and the bone conduction microphone (e.g., the bone conduction microphone 320 shown in FIG. 3) may be other types of microphones, for example, the bone conduction microphone 320 may be a two-axis microphone, a three-axis microphone, a vibration sensor, and an accelerometer, etc.

Figure 7:
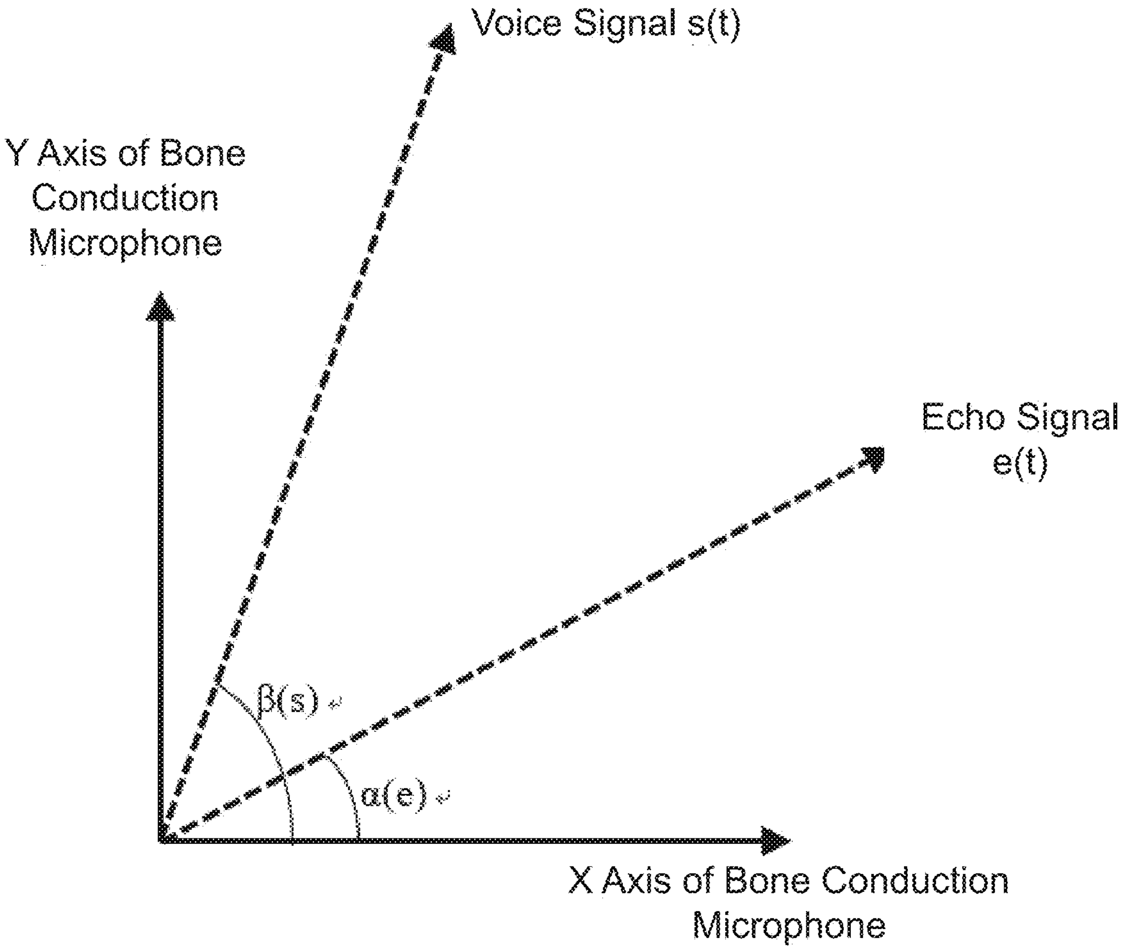
FIG. 7 is a schematic diagram illustrating that a two-axis microphone generates an electrical signal according to some embodiments of the present disclosure.

Continuously, according to FIG. 3 and FIG. 4, in some embodiments, the bone conduction microphone 320 may be a two-axis microphone, i.e., the bone conduction microphone 320 may convert the mechanical vibration that is received in two directions into the electrical signal. For example, FIG. 7 is a schematic diagram illustrating that a two-axis microphone generates an electrical signal according to some embodiments of the present disclosure. In some embodiments, there may be a specific angle (i.e., a third angle) between the two directions. The third angle is within a range of 0 degrees to 90 degrees. As shown in FIG. 7, the two directions are respectively indicated as an X-axis direction and a Y-axis direction, and the X-axis is perpendicular to the Y-axis. An angle between the echo signal source 380 and the X-axis of the bone conduction microphone is α(e). An angle between the voice signal source 360 and the X-axis of the bone conduction microphone is β(s). An echo signal (i.e., the first mechanical vibration) generated by the echo signal source 380 is e(t). A voice signal (i.e., the second mechanical vibration) generated by the voice signal source 360 is s(t). A vibration component of the echo signal source 380 and the voice signal source 360 on the X-axis of the bone conduction microphone is:

$$x(t)=e(t)\cos(\alpha€)+s(t)\cos(\beta(s)) \quad (2).$$

A vibration component of the echo signal source 380 and the voice signal source 360 on the Y-axis of the bone conduction microphone is:

$$y(t)=e(t)\sin(\alpha(e))+s(t)\sin(\beta(s)) \quad (3).$$

The echo signal of the bone conduction microphone 320 may be eliminated by weighting the vibration component x(t) of the echo source 380 and the voice source 360 on the X-axis of the bone conduction microphone and the vibration component y(t) of the echo signal source 380 and the voice signal source 360 on the Y-axis of the bone conduction microphone, and accordingly, a total sound signal of the bone conduction microphone 320 is:

$$\text{out}(t)=x(t)\sin(\alpha(e))-y(t)\cos(\alpha(e))=s(t)\sin(\alpha(e)-\beta(s)) \quad (4),$$

where a weighting factor corresponding to the vibration component x(t) of the echo signal source 380 and the voice signal source 360 on the X-axis of the bone conduction microphone is sin(α(e)), and a weighting factor corresponding to the vibration component y(t) of the echo source 380 and the voice source 360 on the Y-axis of the bone conduction microphone is −cos(α(e)). In some embodiments, the angle α(e) between the echo signal source 380 and the X-axis of the bone conduction microphone may be obtained when the acoustic input-output device is installed. In some embodiments, a(e) may be obtained through the following operations including determining whether a current signal of the bone conduction microphone 320 has a voice signal s(t); when the current signal does not have the voice signal s(t), the α(e) may be obtained through the following equations (5)-(7).

$$x(t)=e(t)\cos(\alpha(e)) \quad (5),$$

$$y(t)=e(t)\sin(\alpha(e)) \quad (6).$$

According to equation (5) and equation (6), the following equation (7) is obtained.

$$\text{Cos}(\alpha(e)) = \frac{x(t)}{\left(x(t)^2 + y(t)^2\right)}. \quad (7)$$

In some embodiments, the x(t) and y(t) may be weighted, and then α(e) may be obtained based on weighted x(t) and y(t) according to the equation (7). In some embodiments, when α(e) is obtained according to equation (9), a more stable α(e) estimate may be obtained by smoothing α(e) in time.

In some embodiments, the bone conduction microphone 320 may be a three-axis microphone. For example, the microphone may have the X-axis, the Y-axis, and a Z-axis, and the sound signal generated by the three-axis microphone may be obtained by weighting vibration components of the voice signal s(t) and the echo signal e(t) on the X, Y, and Z axes of the bone conduction microphone. The principle of obtaining the sound signal generated by the three-axis microphone is similar to the principle of obtaining the sound signal generated by the two-axis microphone, which is not repeated herein.

In some embodiments, the vibration direction of the echo signal source 380 may not be a single direction, for example, the vibration direction of the echo signal source 380 may be diffused along an arc track. In such cases, the vibration in the vibrations generated by the echo signal source 380 that is not perpendicular to the vibration direction of the bone conduction microphone 320 may be received by the bone conduction microphone 320 and converted into the first signal, i.e., an echo signal is generated. Therefore, in some embodiments, the loudspeaker assembly 310 and the bone conduction microphone 320 may be designed, such that a relative location between the bone conduction microphone 320 and the loudspeaker assembly 310 (e.g., the housing 350) is fixed to reduce the vibration transmitted by the echo signal source 380 received by the bone conduction microphone 320.

In some embodiments, in addition to designing the first angle α and the second angle β, a purpose of reducing the echo may be achieved by changing the elasticity coefficient k1 of the first elastic connection 370 and the elastic coefficient k2 of the second elastic connection 390.

In some embodiments, the intensity of the first mechanical vibration received by the bone conduction microphone 320 may be reduced by reducing the elasticity coefficient k2 of the second elastic connection 390 between the bone conduction microphone 320 and the echo signal source 380.

Figure 10:
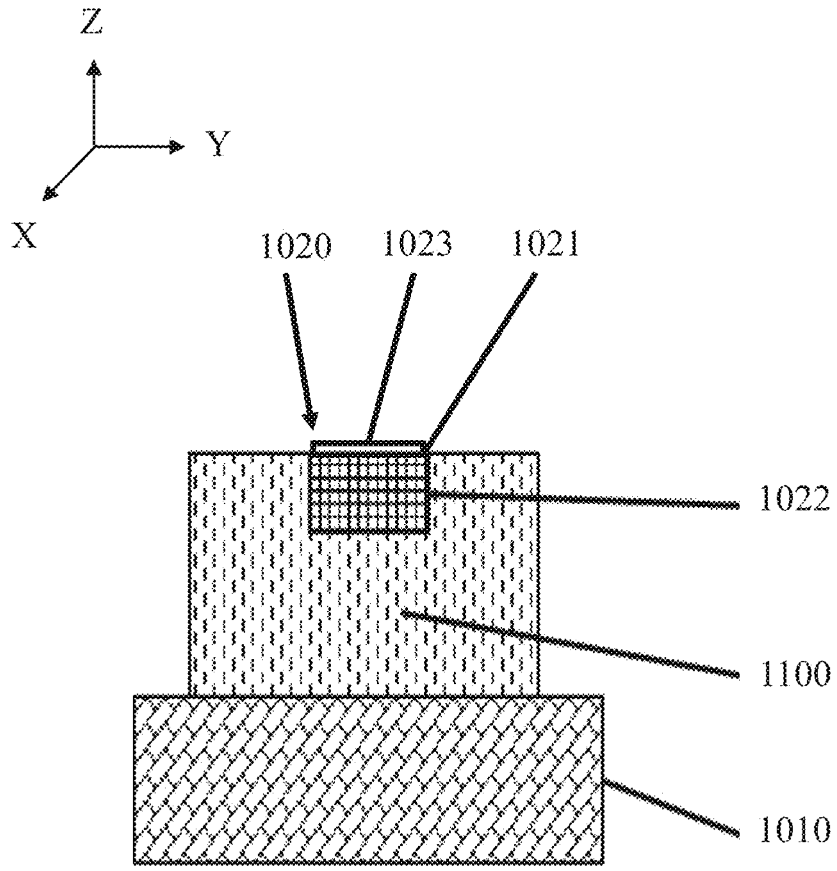
FIG. 10 is a schematic diagram illustrating a cross-section of a bone conduction microphone connected to a damping structure according to some embodiments of the present disclosure.
Figure 11:
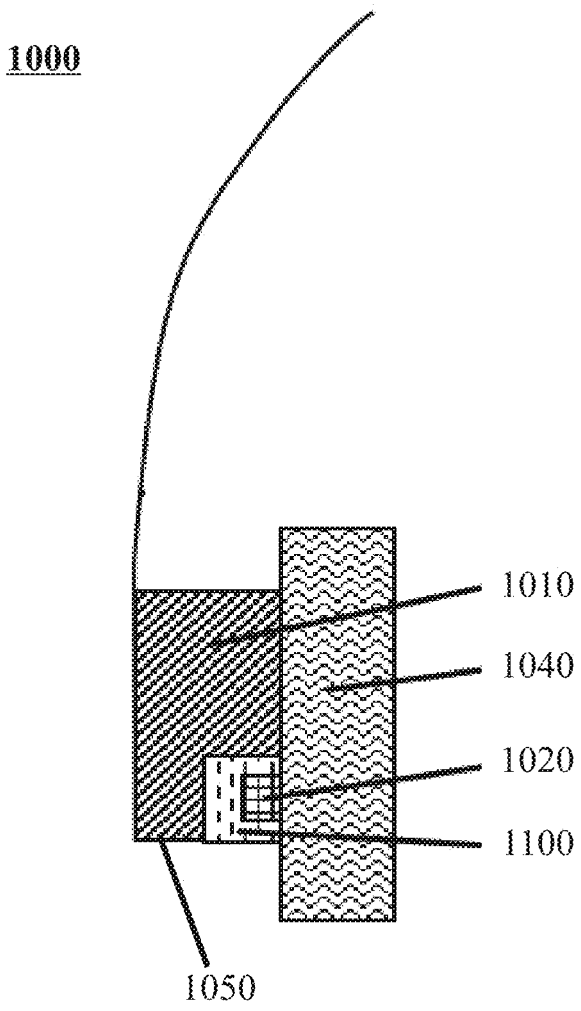
FIG. 11 is a schematic diagram illustrating a cross-section of an acoustic input-output device with a damping structure according to some embodiments of the present disclosure.

FIG. 10 is a schematic diagram illustrating a cross-section of a bone conduction microphone connected to a damping structure according to some embodiments of the present disclosure. FIG. 11 is a schematic diagram illustrating a cross-section of an acoustic input-output device with a damping structure according to some embodiments of the present disclosure. According to FIG. 10 and FIG. 11, an acoustic input-output device 1000 may include a bone conduction microphone 1020 and a loudspeaker assembly 1010. The bone conduction microphone 1020 and the loudspeaker assembly 1010 may be disposed in a same housing. In some embodiments, the acoustic input-output device 1000 may further include a damping structure 1100, and the bone conduction microphone 1020 is connected to the loudspeaker assembly 1010 through the damping structure 1100. When the bone conduction microphone 1020 and the loudspeaker assembly 1010 operate simultaneously, the loudspeaker assembly 1010 may transmit a voice signal (sound waves) through a first mechanical vibration, and the bone conduction microphone 1020 may receive a second mechanical vibration of a voice signal source that is generated when the voice signal source provides a voice signal, to pick up the voice signal. The first mechanical vibration of the loudspeaker assembly 1010 may be transmitted to the bone conduction microphone 1020 through the damping structure 1100, and then the bone conduction microphone 1020 may generate the third mechanical vibration and the fourth mechanical vibration in response to the first mechanical vibration and the second mechanical vibration, respectively. The damping structure 1100 may reduce the intensity of the first mechanical vibration of the loudspeaker assembly 1010 (an echo signal source) received by the bone conduction microphone 1020, thereby reducing the intensity of the first signal generated by the bone conduction microphone 1020.

The damping structure 1100 may refer to a structure with certain elasticity, and an intensity of the mechanical vibration transmitted by the echo signal source 1010 is reduced through the elasticity of the damping structure. In some embodiments, the damping structure 1100 may be an elastic component to reduce the intensity of the transmitted mechanical vibration. The elasticity of the damping structure 1100 may be determined by various aspects such as a material of the damping structure, a thickness of the damping structure, a structure of the damping structure, or the like.

In some embodiments, the damping structure 1100 may be made of a damping material with an elastic modulus less than a first threshold. In some embodiments, the first threshold may be 5000 MPa. In some embodiments, the first threshold may be 4000 MPa. In some embodiments, the first threshold may be 3000 MPa. In some embodiments, the elastic modulus of the damping material may be within a range of 0.01 MPa to 1000 MPa. In some embodiments, the elastic modulus of the damping material may be within a range of 0.015 MPa to 2500 MPa. In some embodiments, an elastic modulus of the damping material may be within a range of 0.02 MPa to 2000 MPa. In some embodiments, the elastic modulus of the damping material may be within a range of 0.025 MPa to 1500 MPa. In some embodiments, an elastic modulus of the damping material may be within a range of 0.03 MPa to 1000 MPa. In some embodiments, the damping material may include, but is not limited to, foam, plastic (e.g., but not limited to, polymer polyethylene, blow-molded nylon, engineering plastic, etc.), rubber, silicone, etc. In some embodiments, the damping material may be the foam.

In some embodiments, the damping structure 1100 may have a certain thickness. Referring to FIG. 10, the thickness of the damping structure 1100 may be understood as a size of the damping structure 1100 in any direction of the X-axis direction, the Y-axis direction, or the Z-axis direction. In some embodiments, the thickness of the damping structure 1100 may be within a range of 0.5 mm to 5 mm. In some embodiments, the thickness of the damping structure 1100 may be within a range of 1 mm to 4.5 mm. In some embodiments, the thickness of the damping structure 1100 may be within a range of 1.5 mm to 4 mm. In some embodiments, the thickness of the damping structure 1100 may be within a range of 2 mm to 3.5 mm. In some embodiments, the thickness of the damping structure 1100 may be within a range of 2 mm to 3 mm.

In some embodiments, the elasticity of the damping structure 1100 may be provided by its structural design. For example, the damping structure 1100 may be an elastic structure, even if the material used to make the damping structure 1100 has high stiffness, its structure can provide elasticity. In some embodiments, the damping structure 1100 may include, but is not limited to, a spring-like structure, a ring or ring-like structure, etc.

In some embodiments, a surface of the bone conduction microphone 1020 may include a first portion 1021 and a second portion 1022. The first portion 1021 may be in contact with the user's face 1040 to conduct the second mechanical vibration provided by the voice signal source, the second portion 1022 may be connected to other components (e.g., the loudspeaker assembly 1010) of the acoustic input-output device 1000. The second portion 1022 may be provided with the damping structure 1100. The second portion 1022 is connected to the loudspeaker assembly 1010 through the damping structure 1100. In the embodiments, the damping structure 1100 arranged between the loudspeaker assembly 1010 and the bone conduction microphone 1020 has a certain elasticity, which may reduce the first mechanical vibration transmitted by the loudspeaker assembly 1010 and reduce the intensity of the first mechanical vibration received by the bone conduction microphone 1020, which makes the echo signal generated by the bone conduction microphone 1020 to be small. Further, since the first portion 1021 of the surface of the bone conduction microphone 1020 is in contact with the user's face 1040 to transmit the second mechanical vibration, the damping structure 1100 is not arranged in the first portion 1021. For example, the first portion 1021 may be close to one side of the microphone diaphragm. Since the second mechanical vibration represents the voice signal provided by the voice signal source, it should be ensured the second mechanical vibration is not weakened as much as possible. Specifically, as shown in FIG. 10 and FIG. 11, the damping structure 1100 may surround the second portion 1022 of the surface of the bone conduction microphone 1020 and not surround the first portion 1021 so that the first portion 1021 may be in direct contact with the user's face 1040.

In some embodiments, the damping structure 1100 may be connected to the second portion 1022 of the surface of the bone conduction microphone by adhesive. In some embodiments, the damping structure 1100 may be connected to the bone conduction microphone 1020 by welding, clamping, riveting, a threaded connection (e.g., by screws, screws rods, bolts, and other components), a clamp connection, a pin connection, a wedge key connection, and integral molding.

In some embodiments, the first portion 1021 of the surface of the bone conduction microphone 1020 may be provided with a vibration transmission layer 1023. The stiffness of the bone conduction microphone 1020 is relatively great, if the first portion 1021 is in direct contact with the user's face 1040, the user may feel uncomfortable, which reduces the user experience. After the first portion 1021 is provided with vibration transmission layer 1023, when the user wears the bone conduction microphone 1020, the tactile feeling may be better, which may effectively improve the user experience.

In some embodiments, the vibration transmission layer 1023 needs to maintain a certain elasticity, which reduces a loss of the second mechanical vibration during conduction, and ensures that the tactile feeling when the user wears the acoustic input-output device 1000. In some embodiments, the elastic modulus of the material of the vibration transmission layer 1023 is too small, which means that the elasticity of the material of the vibration transmission layer 1023 is relatively small, which weakens the intensity of the second mechanical vibration. Therefore, in some embodiments, the elastic modulus of the material of the vibration transmission layer 1023 may be greater than a second threshold. In some embodiments, the second threshold may be 0.01 Mpa. In some embodiments, the second threshold may be 0.015 Mpa. In some embodiments, the second threshold may be 0.02 Mpa. In some embodiments, the second threshold may be 0.025 Mpa. In some embodiments, the second threshold may be 0.03 Mpa. In some embodiments, the elastic modulus of the vibration transmission layer 1023 may be within a range of 0.03 MPa to 3000 MPa. In some embodiments, the elastic modulus of the vibration transmission layer 1023 may be within a range of 5 MPa to 2000 MPa. In some embodiments, the elastic modulus of the vibration transmission layer 1023 may be within a range of 10 MPa to 1500 MPa. In some embodiments, the elastic modulus of the vibration transmission layer 1023 may be within a range of 10 MPa to 1000 MPa. In some embodiments, the material of the vibration transmission layer 1023 may be silicone (the elastic modulus of the silicone is 10 MPa), rubber, or plastic (the elastic modulus of the plastic is 1000 MPa).

In some embodiments, the loss of the second mechanical vibration during conduction may be reduced by reducing the thickness of the vibration transmission layer 1023. When the thickness of the vibration transmission layer 1023 is relatively thin, even if the elastic modulus of the material of the vibration transmission layer 1023 is relatively small, the intensity of the second mechanical vibration is not greatly lost. In some embodiments, the thickness of the vibration transmission layer 1023 may be less than 30 mm. In some embodiments, the thickness of the vibration transmission layer 1023 may be less than 25 mm. In some embodiments, the thickness of the vibration transmission layer 1023 may be less than 20 mm. In some embodiments, the thickness of the vibration transmission layer 1023 may be less than 15 mm. In some embodiments, the thickness of the vibration transmission layer 1023 may be less than 10 mm. In some embodiments, the thickness of the vibration transmission layer 1023 may be less than 5 mm. In some embodiments, the rubber or silicone with a thickness of 5 mm may be used to produce the vibration transmission layer 1023 to ensure a good tactile feeling and the intensity of the second mechanical vibration received by the bone conduction microphone 1020.

It is noted that the above-mentioned embodiments of the acoustic input-output device 1000 are applicable to both the bone conduction loudspeaker assembly and the air conduction loudspeaker assembly. For example, when the acoustic input-output device 1000 is a bone conduction loudspeaker assembly, a housing 1050 may be a portion of the bone conduction loudspeaker assembly, and the bone conduction microphone 1020 may be connected to the housing of the bone conduction loudspeaker assembly through the damping structure 1010. When the acoustic input-output device 1000 is an air conduction loudspeaker assembly, the air conduction loudspeaker assembly and the bone conduction microphone 1020 may both be connected to the housing (e.g., a diaphragm is connected to the housing and the bone conduction microphone 1020 is connected to the housing), and the damping structure is provided between the bone conduction microphone 1020 and the housing.

In some embodiments, the intensity of the second mechanical vibration received by the bone conduction microphone may be increased by increasing a clamping force formed between the acoustic input-output device 1000 and a contact portion of the user. It is understood that the closer the contact between the acoustic input-output device 1000 and the contact portion (e.g., the user's face 1040) of the user, the less the loss of the second mechanical vibration during transmission, but if the clamping force formed between the acoustic input-output device 1000 and the contact portion of the user is great, the user will feel pain and have a poorer service experience. Therefore, the clamping force needs to be controlled within a specific range. In some embodiments, when the loudspeaker assembly 1010 is the air conduction loudspeaker assembly, i.e., the acoustic input-output device 1000 transmits the sound signal to the user through the air conduction loudspeaker assembly and receives the voice signal of the user through the bone conduction microphone 1020, the clamping force may be within a range of 0.001N to 0.3N. In some embodiments, the clamping force may be within a range of 0.0025N to 0.25N. In some embodiments, the clamping force may be within a range of 0.005N to 0.15N. In some embodiments, the clamping force may be within a range of 0.0075N to 0.1N. In some embodiments, the clamping force may be within a range of 0.01N to 0.05N. In some embodiments, because the bone conduction loudspeaker assembly transmits the mechanical vibration generated by the vibration component to the user's face through the housing to make the user hear the sound, the clamping force is different when the loudspeaker assembly 1010 is the bone conduction loudspeaker assembly. For example, when the loudspeaker assembly 1010 of the acoustic input-output device 1000 includes the bone conduction loudspeaker assembly, if the clamping force is too small, the intensity of the mechanical vibration transmitted to the user by the bone conduction loudspeaker assembly will also be too small, i.e., a volume of the sound transmitted to the user through the acoustic input-output device 1000 is small. Therefore, to ensure the intensity of the mechanical vibration received by the user, in some embodiments, when the loudspeaker assembly 1010 of the acoustic input-output device 1000 includes the bone conduction loudspeaker assembly, the clamping force needs to be set within a specific range. In some embodiments, the clamping force may be within a range of 0.01N to 2.5N. In some embodiments, the clamping force may be within a range of 0.025N to 2N. In some embodiments, the clamping force may be within a range of 0.05N to 1.5N. In some embodiments, the clamping force may be within a range of 0.075N to 1N. In some embodiments, the clamping force may be within a range of 0.1N to 0.5N.

In some embodiments, the loudspeaker assembly 1010 may be directly connected to the bone conduction microphone 1020, for example, the bone conduction microphone 1020 is directly connected to and accommodated within the housing 1050 of the loudspeaker assembly 1010 (the housing of the bone conduction loudspeaker assembly). In some embodiments, the bone conduction microphone may be indirectly connected to the loudspeaker assembly.

Figure 12:
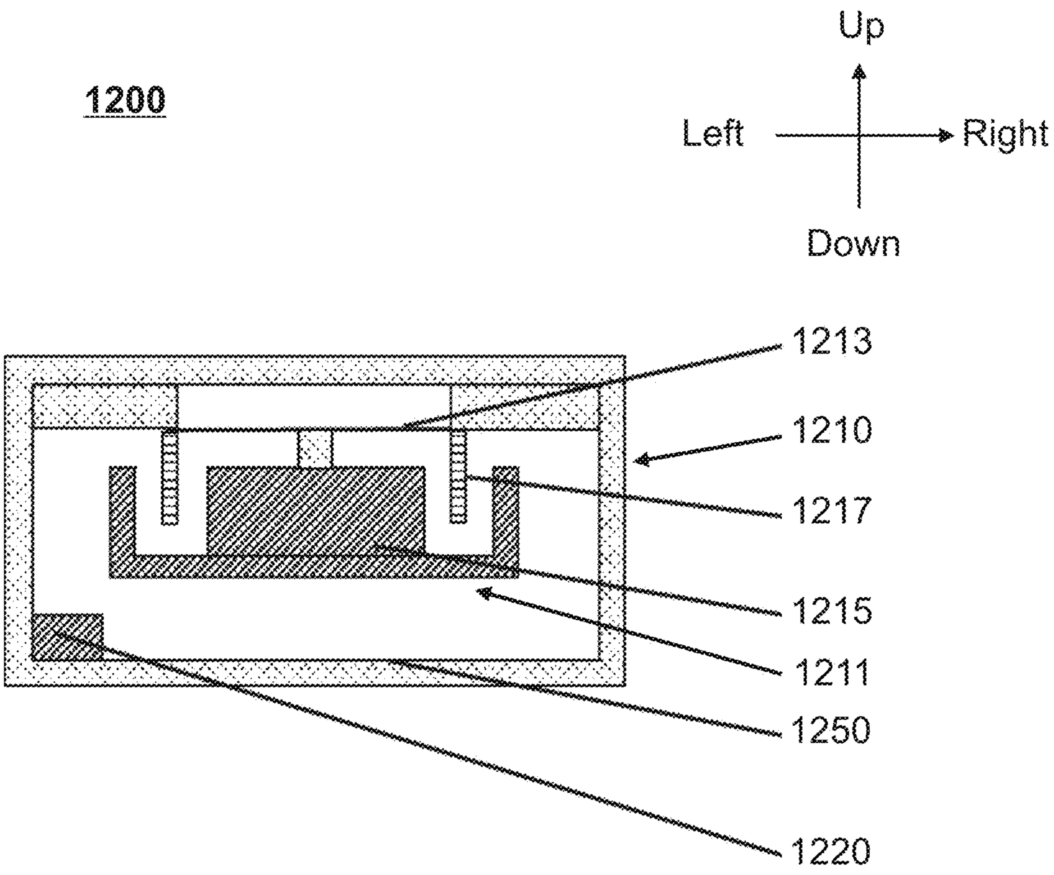
FIG. 12 is a schematic diagram illustrating a cross-section of an acoustic input-output device according to some embodiments of the present disclosure.

FIG. 12 is a schematic diagram illustrating a cross-section of an acoustic input-output device according to some embodiments of the present disclosure. In some embodiments, an acoustic input-output device 1200 includes a loudspeaker assembly 1210 and a bone conduction microphone 1220. The loudspeaker assembly 1210 is a bone conduction loudspeaker assembly. The loudspeaker assembly 1210 may include a housing 1250 and a vibration component 1211 that is connected to the housing 1250 and configured to generate the first mechanical vibration during a process of transmitting sound waves. The bone conduction microphone 1220 is connected to the housing 1250. As shown in FIG. 12, the vibration component 1211 may include a vibration transmission sheet 1213, a magnetic circuit assembly 1215, and a coil 1217 (or a voice coil). The magnetic circuit assembly 1215 may be configured to form a magnetic field, and the coil 1217 may mechanically vibrate in the magnetic field to cause the vibration of the vibration transmission sheet 1213. Specifically, when a signal current is passed through the coil 1217, the coil 1217 is in the magnetic field formed by the magnetic circuit assembly 1215 and is subjected to the action of an Ampere force to generate the mechanical vibration. The vibration of the coil 1217 drives the vibration transmission sheet 1213 to generate mechanical vibration. The mechanical vibration of the vibration transmission sheet 1213 may be further transmitted to the housing 1250, and then the housing 1250 is in contact with the user to make the user hear the sound.

In some embodiments, the bone conduction microphone 1220 may be arranged at any location of an inner wall of the housing 1250. For example, as shown in FIG. 12, the bone conduction microphone 1220 may be arranged at a connection between an inner wall at a lower side of the housing 1250 and an inner wall at a left side of the housing 1250. As another example, the bone conduction microphone 1220 may be arranged on the inner wall at the lower side of the housing 1250 and not in contact with the inner wall at the left side or a right side of the housing 1250. The acoustic input-output device 1200 may be combined with one or more of the above embodiments. For example, a damping structure is provided between the bone conduction microphone 1220 and the housing 1250 shown in FIG. 12 to reduce the intensity of the first mechanical vibration received by the bone conduction microphone 1220.

Figure 13:
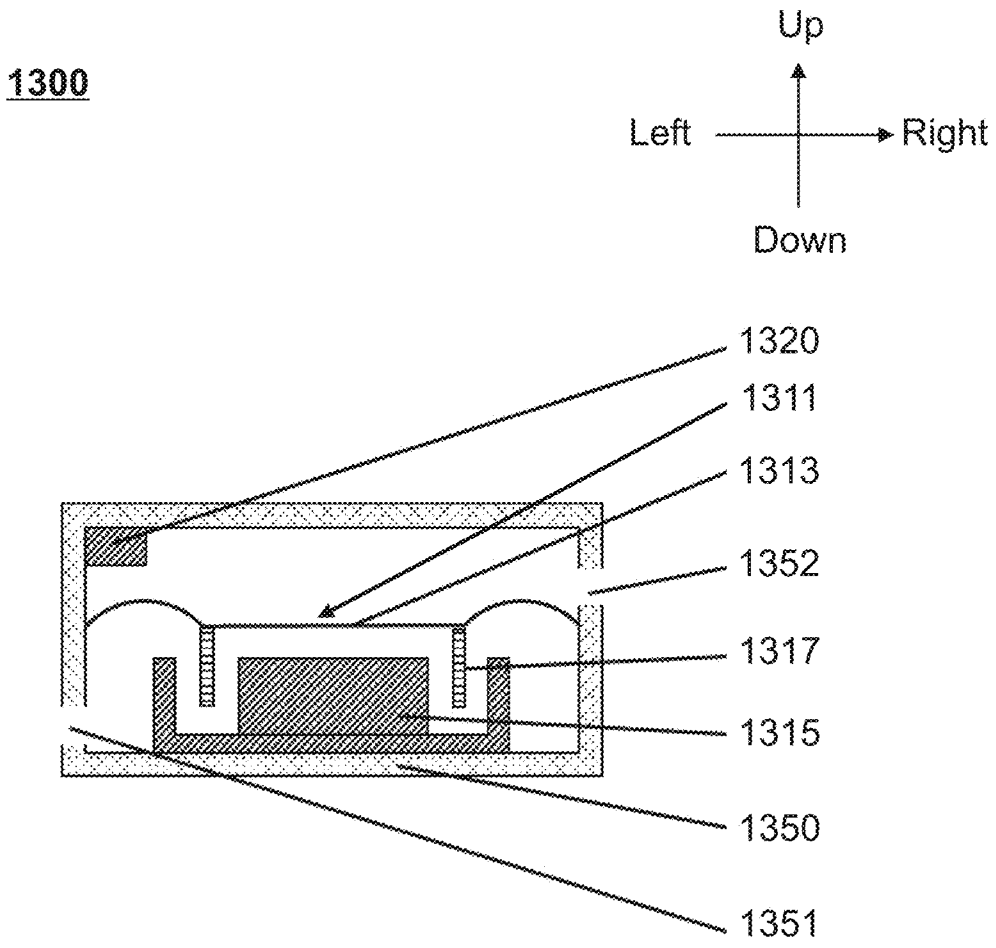
FIG. 13 is a schematic diagram illustrating a cross-section of an acoustic input-output device according to some embodiments of the present disclosure.

FIG. 13 is a schematic diagram illustrating a cross-section of an acoustic input-output device according to some embodiments of the present disclosure. An acoustic input-output device 1300 includes a loudspeaker assembly 1310 and a bone conduction microphone 1320. In some embodiments, the loudspeaker assembly 1310 is an air conduction loudspeaker assembly, and the loudspeaker assembly 1310 may include a housing 1350 and a vibration component 1311. The vibration component 1311 may include a diaphragm 1313, a magnetic circuit assembly 1315, and a coil 1317. The magnetic circuit assembly 1315 may be configured to form a magnetic field, and the coil 1317 may mechanically vibrate in the magnetic field to cause the vibration of diaphragm 1313. There is a first connection between the housing 1350 and the vibration component 1311. The first connection may include a first damping structure.

When the air conduction loudspeaker assembly operates, the diaphragm 1313 generates a mechanical vibration. Since the diaphragm 1313 and the housing 1350 are directly connected (as shown in FIG. 13), the mechanical vibration of the diaphragm 1313 causes the housing 1350 to vibrate mechanically. Different from the bone conduction loudspeaker assembly shown in FIG. 12, the air conduction loudspeaker assembly does not need to rely on the vibration of the housing 1350 to transmit the sound waves, but relies on several sound transmission holes (e.g., first sound transmission holes 1351 and second sound transmission hole 1352*s*) set on the housing to transmit the sound waves to the user. Therefore, the mechanical vibration of the housing 1350 may be reduced by arranging a first damping structure between the vibration component 1311 and the housing 1350, such that the intensity of the mechanical vibration that is transmitted by the housing 1350 received by the bone conduction microphone 1320 is reduced.

In some embodiments, the arrangement manner of the first damping structure may be the same or similar to the arrangement manner the damping structure 1100 in the above embodiments. For example, the first damping structure may be made of the same thickness, the same material, and the same structure as the damping structure 1100. In some embodiments, the first damping structure may be different from the damping structure 1100. For example, the first damping structure may be a strip or sheet member with a certain elasticity. Both ends of the strip or sheet member are respectively connected to the diaphragm 1313 and the housing 1350 to reduce the intensity of the mechanical vibration transmitted by the diaphragm 1313 to the housing 1350. The first damping structure may also be a ring member. The middle of the ring member is connected to the diaphragm, and an outer side of the ring member is connected to the housing 1350, which may reduce the intensity of the mechanical vibration transmitted by the diaphragm 1313 to the housing 1350.

With continued reference to FIG. 13, in some embodiments, there may be a second connection between the housing 1350 and the bone conduction microphone 1320. The second connection may include a second damping structure. The second damping structure may reduce the intensity of the mechanical vibration (i.e., the third mechanical vibration) transmitted to the bone conduction microphone 1320 through the housing 1350.

In some embodiments, the bone conduction microphone 1320 and the loudspeaker assembly 1310 may be respectively arranged in different regions of the acoustic input-output device, and then the second damping structure is arranged between the bone conduction microphone 1320 and the housing 1350 of the loudspeaker assembly 1310. In some embodiments, the bone conduction microphone 1320 may be separately arranged in other regions of the acoustic input-output device and then connected to the housing 1350 through the second damping structure. For example, in the embodiments shown in FIG. 17, an acoustic input-output device 1700 is a monaural headset, and a bone conduction microphone 1720 and a loudspeaker assembly 1710 are respectively arranged in two earmuffs 1731 on both sides of a fixing assembly 1730 and connected through the fixing assembly 1730. In the embodiments shown in FIG. 17, the second connection includes the fixing assembly 1730 and the earmuffs 1731 arranged on both sides of the fixing assembly 1730, and the second damping structure may be arranged on the fixing assembly 1730 and the earmuffs 1731. For example, a layer of vibration-damping material is provided outside the fixing assembly 1730 as a second damping structure. As another example, in the embodiments shown in FIG. 18, an acoustic input-output device 1800 is a binaural headset, a sponge sleeve 1833 is arranged on an earmuff 1831, and the bone conduction microphone 1820 is arranged in the sponge sleeve 1833 and connected to the housing 1850 of the loudspeaker assembly 1810 through the sponge sleeve 1833. In the embodiments, the sponge sleeve 1833 may be equivalent to the second damping structure, which reduces the intensity of the first mechanical vibration transmitted to the bone conduction microphone 1820. Specific description regarding the second damping structure may be found in other embodiments of the present disclosure (e.g., the embodiments of FIG. 17, FIG. 18, and FIG. 19), which is not repeated herein.

The above embodiments of the second damping structure are applicable not only to the air conduction loudspeaker assembly, but also to the bone conduction loudspeaker assembly. For example, the loudspeaker assembly in the embodiments shown in FIG. 17 and FIG. 18 may be replaced with the bone conduction loudspeaker assembly shown in FIG. 12. Taking FIG. 17 as an example, the bone conduction loudspeaker assembly and bone conduction microphone 1720 are respectively arranged in two earmuffs 1731, and a layer of vibration-damping material may be covered on the fixing assembly 1730 as the second damping structure.

It should be noted that when the bone conduction microphone is arranged inside the housing as shown in FIG. 13 and the bone conduction microphone is directly connected to the housing, the second damping structure is the same as the damping structure in the above-mentioned embodiments, and more descriptions may be found in FIG. 10 and FIG. 11 and their relative descriptions, which is not repeated herein.

According to FIG. 13, in some embodiments, the intensity of the mechanical intensity of the housing 1350 may be reduced not only by arranging the first damping structure between the vibration component 1311 and the housing 1350 but also by other ways. In some embodiments, the impact of the vibration component 1311 on the housing 1350 when vibrating may be reduced by reducing a mass of the vibration component 1311, thereby reducing the intensity of the mechanical vibration of the housing 1350. The vibration component 1311 may include the diaphragm 1313, and the mechanical vibration of the housing 1350 is caused by the vibration of the diaphragm 1313. If the mass of the vibration component 1311 (e.g., the diaphragm 1313) is smaller, the impact of the vibration component 1311 on the housing 1350 when vibrating is small, and the intensity of the mechanical vibration generated by the housing 1350 is small. In some embodiments, the mass of the diaphragm 1313 may be controlled to be within a range of 0.001 g to 1 g. In some embodiments, the mass of the diaphragm 1313 may be controlled to be within a range of 0.002 g to 0.9 g. In some embodiments, the mass of the diaphragm 1313 may be controlled to be within a range of 0.003 g to 0.8 g. In some embodiments, the mass of the diaphragm 1313 may be controlled to be within a range of 0.004 g to 0.7 g. In some embodiments, the mass of the diaphragm 1313 may be controlled to be within a range of 0.005 g to 0.6 g. In some embodiments, the mass of the diaphragm 1313 may be controlled to be within a range of 0.005 g to 0.5 g. In some embodiments, the mass of the diaphragm 1313 may be controlled within a range of 0.005 g to 0.3 g.

Similarly, if a mass of the housing 1350 is much greater than the mass of the diaphragm 1313, the impact of the mechanical vibration of the diaphragm 1313 on the housing 1350 is relatively small. Therefore, in some embodiments, the intensity of the mechanical vibration of the housing 1350 may be reduced by increasing the mass of the housing 1350. In some embodiments, the mass of the housing 1350 may be controlled to be within a range of 2 g to 20 g. In some embodiments, the mass of the housing 1350 may be controlled to be within a range of 3 g to 15 g. In some embodiments, the mass of the housing 1350 may be controlled to be within a range of 4 g to 10 g. In some embodiments, a ratio of the mass of the housing 1350 to the mass of the diaphragm 1313 may be controlled, so that the mass of the housing 1350 is much larger than the mass of the diaphragm 1313, thereby reducing the impact of the mechanical vibration of the diaphragm 1313 on the housing 1350. In some embodiments, the ratio of the mass of the housing 1350 to the mass of the diaphragm 1313 may be controlled to be within a range of 10 to 100. In some embodiments, the ratio of the mass of the housing 1350 to the mass of the diaphragm 1313 may be controlled to be within a range of 15 to 80. In some embodiments, the ratio of the mass of the housing 1350 to the mass of the diaphragm 1313 may be controlled to be within a range of 20 to 60. In some embodiments, the ratio of the mass of the housing 1350 to the mass of the diaphragm 1313 may be controlled to be within a range of 25 to 50. In some embodiments, the ratio of the mass of the housing 1350 to the mass of the diaphragm 1313 may be controlled to be within a range of 30 to 50.

Figure 14:
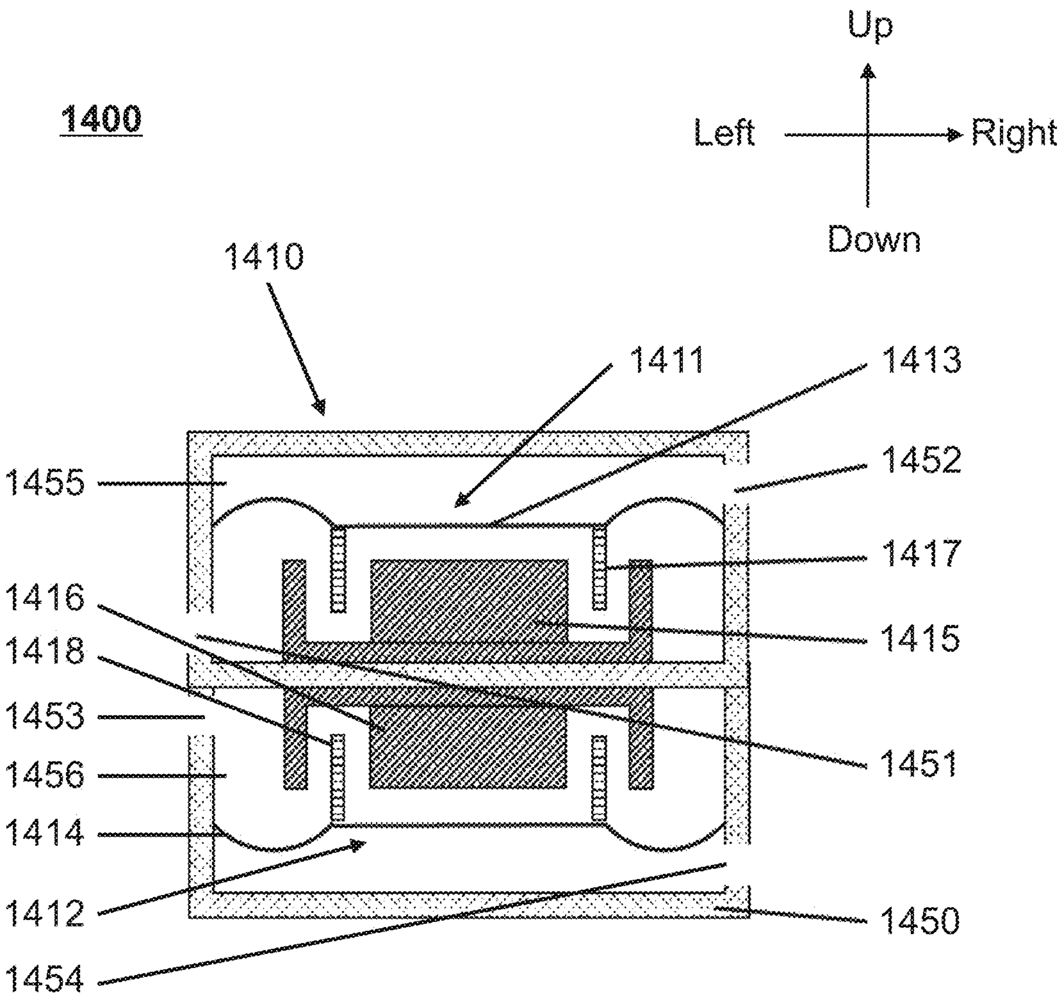
FIG. 14 is a schematic diagram illustrating a cross-section of an acoustic input-output device with two air conduction loudspeaker assemblies according to some embodiments of the present disclosure.
Figure 15:
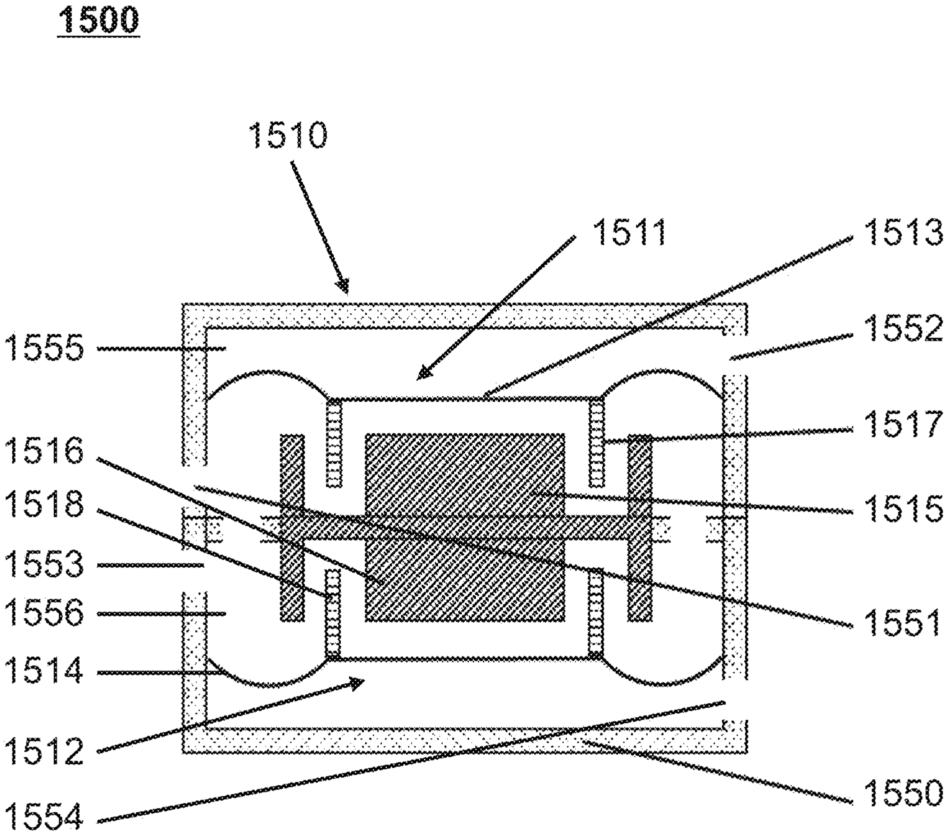
FIG. 15 is a schematic diagram illustrating a cross-section of an acoustic input-output device with two air conduction loudspeaker assemblies according to some embodiments of the present disclosure.

FIG. 14 is a schematic diagram illustrating a cross-section of an acoustic input-output device with two air conduction loudspeaker assemblies according to some embodiments of the present disclosure. FIG. 15 is a schematic diagram illustrating a cross-section of an acoustic input-output device with two air conduction loudspeaker assemblies according to some embodiments of the present disclosure. In the embodiments shown in FIG. 14 and FIG. 15, the loudspeaker assemblies are both the air conduction loudspeaker assemblies. As shown in FIG. 14, in some embodiments, a loudspeaker assembly 1410 may include a first vibration component 1411 and a second vibration component 1412. The first vibration component 1411 includes a first diaphragm 1413, a first magnetic circuit assembly 1415, and a first coil 1417. The second vibration component 1412 includes a second diaphragm 1414, a second magnetic circuit assembly 1416, and a second coil 1418 (or a voice coil). In some embodiments, a vibration direction of the first diaphragm 1413 and a vibration direction of the second diaphragm 1414 are opposite. For example, FIG. 14 illustrates the vibration directions of the first diaphragm 1413 and the second diaphragm 1414 at a moment, wherein the first diaphragm 1413 vibrates from top to bottom, and the second diaphragm 1414 vibrates from bottom to top. The sound heard by the user does not come from the vibration of the user's bone, skin, etc., but from the first diaphragm 1413 and the second diaphragm 1414 changing the air density by pushing the air to vibrate. Therefore, without affecting a volume of the sound signal output by the air conduction loudspeaker assembly, the intensity of the mechanical vibration (i.e., the third mechanical vibration) that is transmitted by the housing 1450 received by the bone conduction microphone (not shown) may be reduced by reducing the intensity of the mechanical vibration (i.e., the first mechanical vibration) of the housing 1450 and the components (i.e., the echo signal source), connected to the housing 1450, thereby reducing the intensity of the first signal generated by the bone conduction microphone. In addition, the loudspeaker assembly 1410 is further provided with the second diaphragm 1414 that vibrates in an opposite direction to the first diaphragm 1413. There are two diaphragms arranged in the air conduction loudspeaker assembly, and the mechanical vibration generated by the first diaphragm 1413 causes the housing 1450 to vibrate, and the mechanical vibration generated by the second diaphragm 1414 also causes the housing 1450 to vibrate. Because the vibration direction of the first diaphragm 1413 and the vibration direction of the second diaphragm 1414 are opposite, the two mechanical vibrations caused by the first diaphragm 1413 and the second diaphragm 1414 on the housing cancel out each other, such that the intensity of the mechanical vibration of the housing is reduced. In some embodiments, the two diaphragms may be components within a same air conduction loudspeaker assembly. In other embodiments, the acoustic input-output device 1400 may include a first air conduction loudspeaker assembly and a second air conduction loudspeaker assembly. The first diaphragm 1413 is a component in the first air conduction loudspeaker assembly, and the second diaphragm 1414 is a component in the second air conduction loudspeaker assembly. In the embodiments shown in FIG. 14, it may be considered that there are two air conduction loudspeaker assemblies respectively being located in different regions of the housing 1450, and each air conduction loudspeaker assembly includes a diaphragm, a magnetic circuit assembly, and a coil.

In some embodiments, the housing 1450 may include a first cavity 1455 and a second cavity 1456, and the first diaphragm 1413 and the second diaphragm 1414 may be respectively located in the first cavity 1455 and the second cavity 1456. The housing 1450 may include a first portion corresponding to the first cavity 1455 and a second portion corresponding to the second cavity 1456. A side wall of the first cavity 1455 (i.e., a side wall of the first portion of the housing 1450) may be set with a first sound transmission hole 1451 and a second sound transmission hole 1452. In some embodiments, the first sound transmission hole 1451 and the second sound transmission hole 1452 may be arranged on different side walls of the first portion of the housing 1450. In some embodiments, the first sound transmission hole 1451 and the second sound transmission hole 1452 may be arranged on non-adjacent side walls of the first portion of the housing 1450, i.e., the first sound transmission hole 1451 and the second sound transmission hole 1452 may be arranged on opposite side walls of the first portion of the housing 1450 (as shown in FIG. 14).

A side wall of the second cavity 1456 (i.e., a side wall of the second portion of the housing 1450) may be provided with a third sound transmission hole 1453 and a fourth sound transmission hole 1454. In some embodiments, the third sound transmission hole 1453 and the fourth sound transmission hole 1454 may be arranged on different side walls of the second portion of the housing 1450. In some embodiments, the third sound transmission hole 1453 and the fourth sound transmission hole 1454 may be arranged on non-adjacent side walls of the second portion of the housing 1450, i.e., the third sound transmission hole 1453 and the fourth sound transmission hole 1454 may be provided on opposite walls of the second portion of the housing 1450 (as shown in FIG. 14).

As shown in FIG. 14, in some embodiments, the first sound transmission hole 1451 and the third sound transmission hole 1453 may be arranged on a same side of the housing 1450, the second sound transmission hole 1452 and the fourth sound transmission hole 1454 may be provided on the same side of the housing 1450, so that a phase of sound transmitted by the first sound transmission hole 1451 is the same as a phase of sound transmitted by the third sound transmission hole 1453, and a phase of sound transmitted by the second sound transmission hole 1452 is the same as a phase of sound transmitted by the fourth sound transmission hole 1454. In the embodiments, the housing 1450 is divided into two cavities that are not spatially connected, i.e., the first cavity 1455 and the second cavity 1456. The first air conduction loudspeaker assembly (the first vibration component 1411) and the second air conduction loudspeaker assembly (or the second vibration component 1412) are respectively located in the two cavities. The first cavity 1455 may be divided into a front cavity and a rear cavity by the first diaphragm 1413. The first sound transmission hole 1451 and the third sound transmission hole 1453 may be equivalent to sound transmission holes of the front cavities of the first cavity 1455 and the second cavity 1456, respectively, and the second sound transmission hole 1452 and the fourth sound transmission hole 1454 may be equivalent to sound transmission holes of the rear cavities of the first cavity 1455 and the second cavity 1456, respectively. When the phases of sounds of the front cavity sound transmission holes of the first cavity 1455 and the second cavity 1456 are the same, and the phases of sounds of the rear cavity sound transmission holes of the first cavity 1455 and the second cavity 1456 are also the same, phases of sounds transmitted from both diaphragms are the same, so that a volume of the air conduction is not reduced.

In some embodiments, when the loudspeaker assembly 1410 has multiple diaphragms, a structure of the loudspeaker assembly 1410 may be adjusted to reduce an overall size.

As shown in FIG. 15, in some embodiments, a loudspeaker assembly 1510 may include a first vibration component 1511 and a second vibration component 1512. The first vibration component 1511 includes a first diaphragm 1513, a first magnetic circuit assembly 1515, and a first coil 1517. The second vibration component 1512 includes a second diaphragm 1514, a second magnetic circuit assembly 1516, and a second coil 1518 (or a voice coil). The first cavity 1555 and the second cavity 1556 may be spatially connected. The first magnetic circuit assembly 1515 is integrated with the second magnetic circuit assembly 1516 to reduce the space occupied by the loudspeaker assembly 1510.

In some embodiments, the first air conduction loudspeaker assembly and the second air conduction loudspeaker assembly may be two same loudspeakers. In some embodiments, the first air conduction loudspeaker assembly and the second air conduction loudspeaker assembly may be two different loudspeakers. For example, the acoustic input-output device 1500 includes a first air conduction loudspeaker assembly and a second air conduction loudspeaker assembly. The first air conduction loudspeaker assembly may act as a primary loudspeaker configured to generate the sound signal heard by the user. The second air conduction loudspeaker assembly may act as an auxiliary loudspeaker. The auxiliary loudspeaker produces a force opposite to that of the primary loudspeaker on the housing 1550 by adjusting the intensity of the mechanical vibration of the auxiliary loudspeaker, thereby reducing the intensity of vibration of the housing 1550. In some embodiments, the loudspeaker assembly 1510 may include the primary loudspeaker and an auxiliary device configured to generate the vibration on the housing 1550 in a direction opposite to that of the primary loudspeaker. In some embodiments, the auxiliary device may be a vibration motor that may generate the vibration on the housing 1550 in a direction opposite to that of the primary loudspeaker, thereby reducing the intensity of the vibration of the housing 1550. In some embodiments, the intensity of the mechanical vibration generated by the auxiliary loudspeaker may be adjusted. Specifically, the loudspeaker assembly 1510 may include an auxiliary loudspeaker control device. The auxiliary loudspeaker control device may obtain the intensity and direction of the mechanical vibration of the primary loudspeaker, and adjust the intensity and direction of the mechanical vibration of the auxiliary loudspeaker based on the intensity and direction of the mechanical vibration of the primary loudspeaker. Therefore, a force of the auxiliary loudspeaker on the housing and a force of the primary loudspeaker on the housing 1550 may cancel each other to reduce the vibration of the housing 1550, and accordingly, the vibration transmitted by the housing 1550 to the bone conduction microphone 1520 may be reduced, thereby reducing an intensity of the echo signal generated by the bone conduction microphone (not shown in FIG. 15).

It is noted that the embodiments in which the vibration directions of the two diaphragms are set in opposite directions may be combined with one or more of the above-mentioned embodiments. For example, in the embodiment in which the vibration directions of the two diaphragms are set in opposite directions, the second damping structure may be provided both between the first diaphragm (e.g., the first diaphragm 1413) and the housing (e.g., the housing 1450) and between the second diaphragm (e.g., the second diaphragm 1414) and the housing 1450, which reduces the mechanical vibration received by the housing 1450, thereby reducing the intensity of the first mechanical vibration received by the bone conduction microphone.

Figure 19:
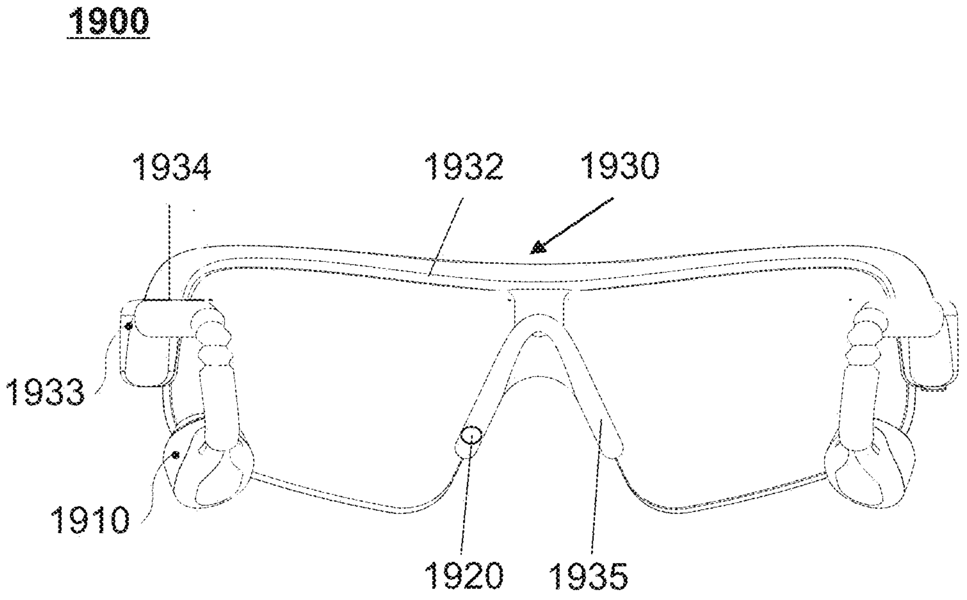
FIG. 19 is a schematic diagram illustrating a structure of glasses according to some embodiments of the present disclosure.

In some embodiments, the voice signal source may be a vibration part of the user when providing the voice signal. For example, when the user speaks, the intensity of vibration of parts of the user such as the vocal cords, the mouth, the nasal cavity, the larynx is significantly greater than the ears, the eyes of the user, and therefore these parts may act as the voice signal source. In some embodiments, when designing the bone conduction microphone 1920, the bone conduction microphone 1920 may be located close to the mouth, the nasal cavity, or the vocal cords of the user. For example, when the acoustic input-output device 1900 is glasses shown in FIG. 19, a bone conduction microphone 1920 may be arranged in a nose bridge frame 1935 of the glasses. Because the bone conduction microphone 1920 is close to the nose bridge of the user, the intensity of the received mechanical vibration is greater. More descriptions regarding the glasses shown in FIG. 19 may be found in other embodiments of the present disclosure and not be repeated herein. As shown in FIG. 19, in some embodiments, the acoustic input-output device 1900 may be arranged such that when the user wears the acoustic input-output device 1900, a distance between the bone conduction microphone 1920 and the vibration part of the user (not shown) is less than a third threshold. As described herein, taking a distance between the bone conduction microphone 1920 and the throat of the user as an example, in some embodiments, the third threshold may be 20 cm. In some embodiments, the third threshold may be 15 cm. In some embodiments, the third threshold may be 10 cm. In some embodiments, the third threshold may be 2 cm. In the embodiments, because the bone conduction microphone 1920 is close to the vibration part of the user, the intensity of the received second mechanical vibration is great, and the intensity of the second signal generated by the bone conduction microphone 1920 is great, thereby effectively improving the intensity of the voice signal.

Figure 16:
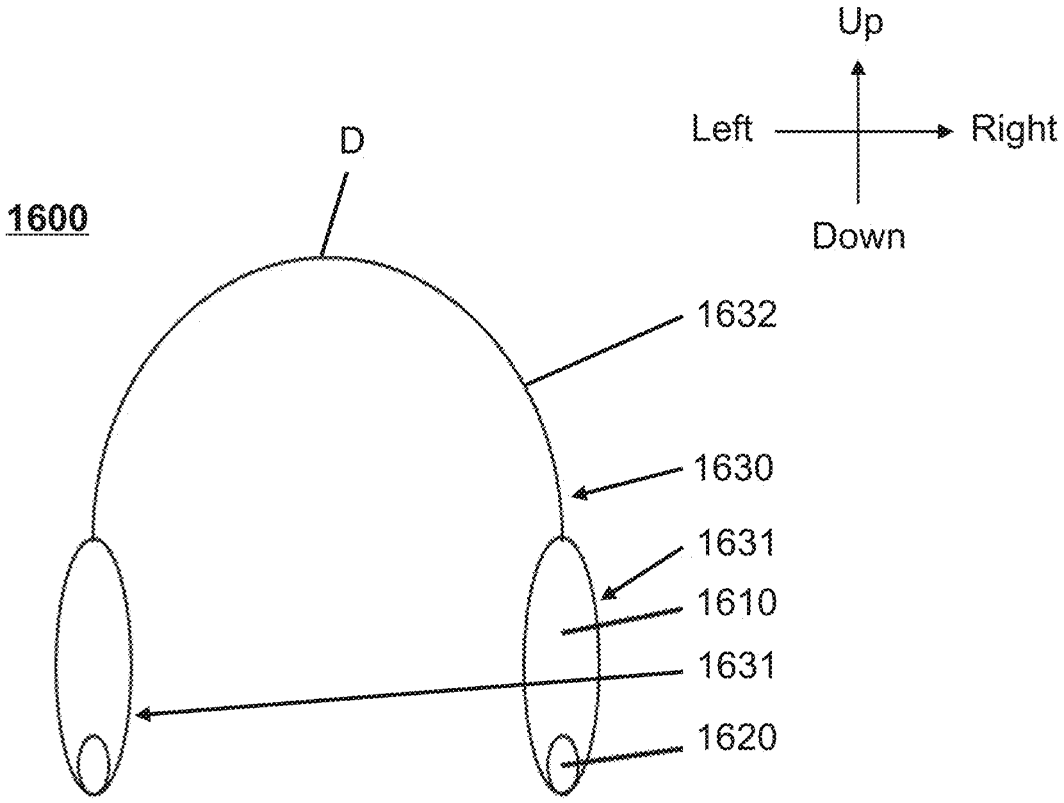
FIG. 16 is a schematic diagram illustrating a structure of a headset according to some embodiments of the present disclosure.

FIG. 16 is a schematic diagram illustrating a structure of a headset according to some embodiments of the present disclosure. As shown in FIG. 16, in some embodiments, an acoustic input-output device 1600 may be a headset including a fixing assembly 1630. The fixing assembly 1630 may include a headband 1632 and two earmuffs 1631 connected to both sides of the headband 1632. The headband 1632 may be configured to fix the headset to the head of the user and fix the two earmuffs to both sides of the head of the user. In some embodiments, the bone conduction microphone 1620 may be located anywhere in the earmuff 1631. For example, the bone conduction microphone 1620 may be disposed at an upper position in the earmuff 1631. As another example, the bone conduction microphone 1620 may be disposed at a lower position in the earmuff 1631 (as shown in FIG. 16), so that when the user wears the acoustic input-output device 1600, a distance between the bone conduction microphone 1620 and the vibration part may be shortened. In the embodiments, the bone conduction microphone 1620 is close to the vibration part of the user, so that the intensity of the vibration (i.e. the fourth mechanical vibration) received by the bone conduction microphone 1620 when the user speaks is great and the intensity of the second signal generated by the bone conduction microphone 1620 is great, and accordingly, a ratio of the intensity of the second signal to the intensity of the fourth signal is great, a proportion of the echo signal in the sound signal generated by the bone conduction microphone is small, and the service experience of the user is good.

Figure 17:
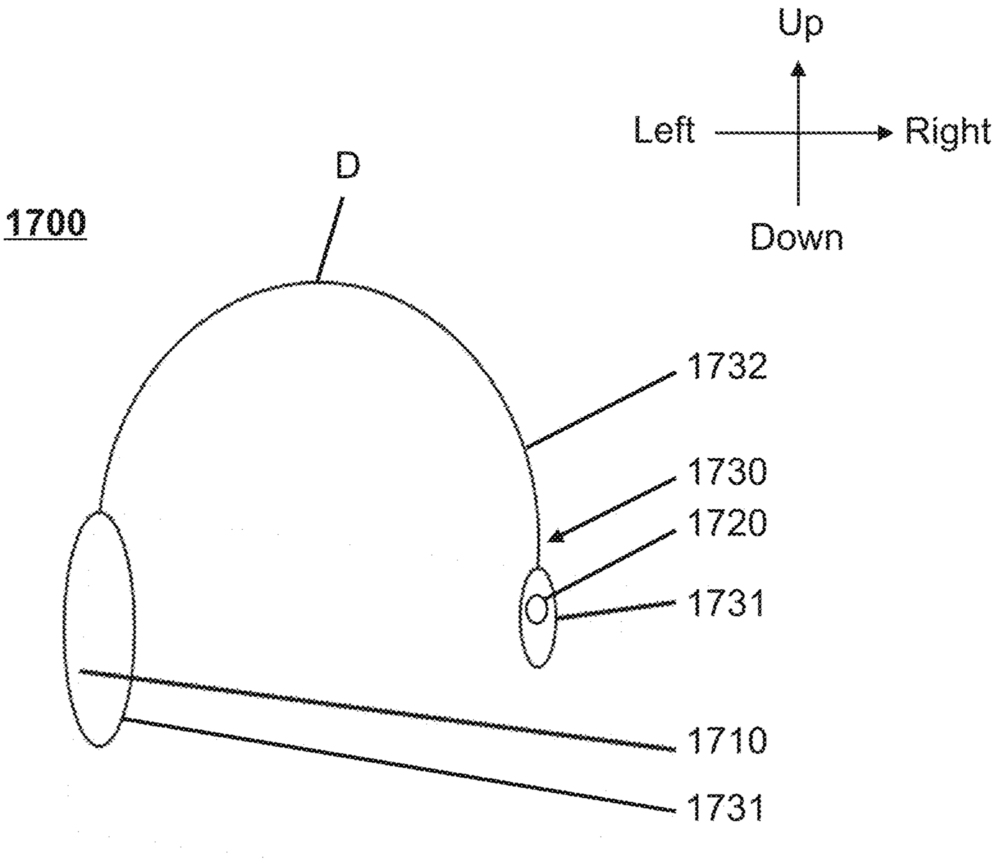
FIG. 17 is a schematic diagram illustrating a structure of a monaural headset according to some embodiments of the present disclosure.

FIG. 17 is a schematic diagram illustrating a structure of a monaural headset according to some embodiments of the present disclosure. As shown in FIG. 17, in some embodiments, an acoustic input-output device 1700 may be a monaural headset, i.e., a bone conduction microphone 1720 and a loudspeaker assembly 1710 may be respectively arranged in two earmuffs 1731, and each earmuff 1731 is provided with only one loudspeaker assembly 1710 or one bone conduction microphone 1720. In the embodiments, since the bone conduction microphone 1720 and the loudspeaker assembly 1710 are arranged in different earmuffs 1731 and located at both sides of the head of the user, a distance between the bone conduction microphone 1720 and the loudspeaker assembly 1710 is far, so an intensity of the first mechanical vibration generated by the loudspeaker assembly 1710 and received by the bone conduction microphone 1720 is small, which causes the proportion of the echo signal in the sound signal generated by the bone conduction microphone to be small and the service experience of the user to be good. In some embodiments, the headband 1732 may include one or more second damping structures (not shown in the figure) configured to reduce the intensity of the first mechanical vibration transmitted by the headband 1732. In some embodiments, the headband 1732 may be provided with a foam through which the intensity of the first mechanical vibration of the bone conduction microphone 1720 transmitted by the loudspeaker assembly 1710 is reduced. In other specific embodiments, the headband 1732 may be made of the second damping material. The second damping material may be the same as the damping material in one or more of the above-mentioned embodiments. For example, the headband 1732 may be made of a material such as silicone or rubber.

In some embodiments, the bone conduction microphone 1720 or the loudspeaker assembly 1710 may not be arranged in the earmuff 1731. For example, the bone conduction microphone may be arranged at a position D on the headband shown in FIG. 16 and FIG. 17, the position D corresponds to the top of the head of the user, and the loudspeaker assembly is arranged in the earmuff. As another example, the loudspeaker assembly may be arranged at the position D on the headband shown in FIG. 16 and FIG. 17, the position D corresponds to the top of the head of the user, and the bone conduction microphone is arranged in the earmuff.

Figure 18:
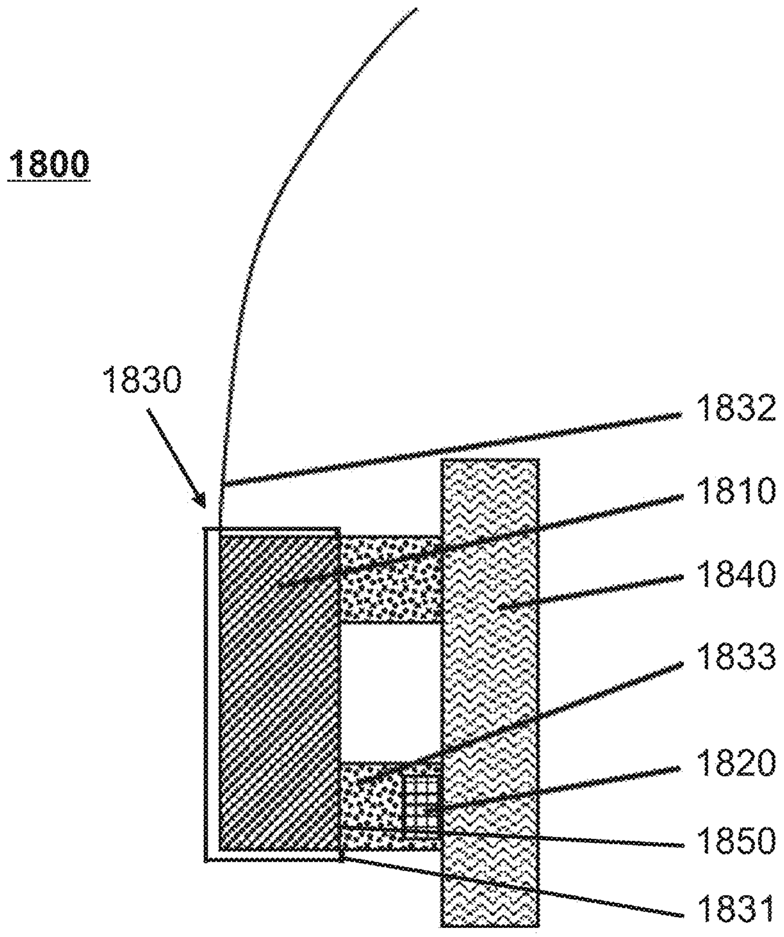
FIG. 18 is a schematic diagram illustrating a cross-section of a binaural headset according to some embodiments of the present disclosure.

FIG. 18 is a schematic diagram illustrating a cross-section of a binaural headset according to some embodiments of the present disclosure. According to FIG. 16 and FIG. 18, in some embodiments, an acoustic input-output device 1800 may be a binaural headset including a fixing assembly 1830. The fixing assembly 1830 may include a headband 1832 and two earmuffs 1831 connected to both sides of the headband 1832. One side of each earmuff 1831 in contact with the user is provided with the sponge sleeve 1833, and the bone conduction microphone 1820 may be accommodated in the sponge sleeve. The arrangement of the sponge sleeve 1833 is equivalent to that the damping structure is arranged between the bone conduction microphone 1820 and the housing 1850 of the loudspeaker assembly 1810, i.e., the second damping structure in the above-mentioned embodiments, which reduces the intensity of the first mechanical vibration generated by the loudspeaker assembly 1810 transmitted through the housing 1850. Further, since the elasticity of the sponge sleeve 1833 is relatively great, the intensity of the second mechanical vibration transmitted by the user's face 1840 is reduced. Therefore, in some embodiments, a portion of a surface of the sponge sleeve 1833 may be provided with a vibration transmission structure with a relatively great stiffness. In some embodiments, the vibration transmission structure may be arranged as a sheet member, for example, a metal sheet or a plastic sheet (neither the metal sheet nor the plastic sheet is shown in the figure). In some embodiments, an outer side of the sheet member may be in contact with the user's face 1840, and an inner side of the sheet member is connected to the bone conduction microphone 1820. In the embodiments, the user's face 1840 is in contact with the bone conduction microphone 1820 through the sheet member with a relatively great stiffness, so as to minimize the loss of vibration (i.e., the second mechanical vibration) of the vibration part received by the bone conduction microphone 1820 during the transmission process when the user speaks, thereby increasing the intensity of the fourth mechanical vibration and the intensity of the voice signal generated by the bone conduction microphone 1820.

FIG. 19 is a schematic diagram illustrating a structure of glasses according to some embodiments of the present disclosure. As shown in FIG. 19, in some embodiments, the acoustic input-output device 1900 may be glasses with loudspeaker and microphone functions. The glasses may include a fixing assembly. The fixing assembly may be a frame 1930. The frame 1930 may include a glasses frame 1932 and two glasses legs 1933. A glasses leg 1933 may include a glasses leg body 1934 connected to the glasses frame 1932. At least one glasses leg body 1934 may include the loudspeaker assembly 1910 as described above in the embodiments of the present disclosure. In some embodiments, the loudspeaker assembly 1910 may include the bone conduction loudspeaker assembly. The bone conduction loudspeaker assembly may be located in a portion of the glasses leg 1933 that may be in contact with the skin of the user. In some embodiments, the glasses frame 1932 may include a nose bridge frame 1935 configured to support the glasses frame 1932 above the nose bridge of the user. The nose bridge frame 1935 may be provided with the bone conduction microphone 1920 as described above in the embodiments of the present disclosure. The nasal cavity serves as the vibration part when the user provides the voice signal, and an intensity of mechanical vibration of the nasal cavity is relatively great. The advantage of arranging the bone conduction microphone in the nose bridge frame 1935 is that, on the one hand, it may increase the strength of the mechanical vibration of the voice signal received by the bone conduction microphone 1920, on the other hand, because the bone conduction microphone 1920 and the loudspeaker assembly 1910 are arranged at different locations of the glasses, the intensity of the first mechanical vibration that is received by the bone conduction microphone 1920 and generated when the speaker assembly 1910 transmits the sound waves is small, and accordingly, the echo signal generated by the bone conduction microphone 1920 is small.

It should be noted that the glasses described in the above embodiments may be various types of glasses, for example, sunglasses, glasses for near-sightedness, and glasses for long-sightedness. In some embodiments, the glasses may o be glasses with a virtual reality (VR) function or an augmented reality (AR) function.

The potential beneficial effects of the embodiments of the present disclosure may include, but are not limited to: (1) The first angle formed between the vibration direction of the bone conduction microphone and the vibration direction of the echo signal source is set within a specific angle range, thereby reducing the intensity of the vibration of the echo signal source received by the bone conduction microphone and the intensity of the generated echo signal (i.e., the first signal). (2) The second angle formed between the vibration direction of the bone conduction microphone and the vibration direction of the voice signal source is set within a specific angle range, thereby improving the intensity of the vibration of the voice signal source received by the bone conduction microphone and the intensity of the generated voice signal (i.e. the second signal). (3) The clamping force formed between the acoustic input-output device and the contact portion of the user is controlled within a specific range, so that the bone conduction microphone is in closer contact with the user, and the intensity of the vibration (i.e. the fourth mechanical vibration) of the voice signal source received by the bone conduction microphone is higher. (4) The damping structure is arranged between the bone conduction microphone and the housing of the loudspeaker assembly to reduce the intensity of the vibration (i.e., the third mechanical vibration) of the loudspeaker assembly. (5) The damping structure is arranged between the vibration component of the loudspeaker assembly and the housing to reduce the impact of the vibration of the vibration component on the housing through the damping structure, thereby reducing the intensity of the mechanical vibration generated by the housing, and accordingly reducing the intensity of the vibration of the speaker component received by the bone conduction microphone. (6) The bone conduction microphone is arranged close to the vibration part when the user provides the voice signal, thereby improving the intensity of the vibration of the voice signal source received by the bone conduction microphone. It should be noted that different embodiments may produce different beneficial effects, and in different embodiments, the possible beneficial effects may be any one or a combination of the above beneficial effects, or any other beneficial effects.

Having thus described the basic concepts, it may be rather apparent to those skilled in the art after reading this detailed disclosure that the foregoing detailed disclosure is intended to be presented by way of example only and is not limiting. Various alterations, improvements, and modifications may occur and are intended for those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure, or characteristic described in connection with the embodiment is included in at least one embodiment of the present disclosure. Therefore, it is emphasized and should be appreciated that two or more references to "an embodiment" or "one embodiment" or "an alternative embodiment" in various portions of this specification are not necessarily all referring to the same embodiment. Furthermore, the particular features, structures, or characteristics may be combined as suitable in one or more embodiments of the present disclosure.

Furthermore, the recited order of processing elements or sequences, or the use of numbers, letters, or other designations thereof, are not intended to limit the claimed processes and methods to any order except as may be specified in the claims. Although the above disclosure discusses through various examples what is currently considered to be a variety of useful embodiments of the disclosure, it is to be understood that such detail is solely for that purpose, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software-only solution, e.g., an installation on an existing server or mobile device.

Similarly, it should be appreciated that in the foregoing description of embodiments of the present disclosure, various features are sometimes grouped together in a single embodiment, figure, or description thereof for the purpose of streamlining the disclosure aiding in the understanding of one or more of the various embodiments. This method of disclosure, however, is not to be interpreted as reflecting an intention that the claimed subject matter requires more features than are expressly recited in each claim. Rather, claimed subject matter may lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the count of reported significant digits and by applying ordinary rounding techniques. Notwithstanding that the numerical ranges and parameters setting forth the broad scope of some embodiments of the application are approximations, the numerical values set forth in the specific examples are reported as precisely as practicable. In closing, it is to be understood that the embodiments of the application disclosed herein are illustrative of the principles of the embodiments of the application. Other modifications that may be employed may be within the scope of the application. Therefore, by way of example, but not of limitation, alternative configurations of the embodiments of the application may be utilized in accordance with the teachings herein. Accordingly, embodiments of the present application are not limited to that precisely as shown and described.

What is claimed is:

1. An acoustic input-output device, comprising:

a loudspeaker assembly configured to transmit sound waves by generating a first mechanical vibration; and a microphone configured to receive a second mechanical vibration of a voice signal source that is generated when the voice signal source provides a voice signal, the microphone generating a first signal and a second signal in response to the first mechanical vibration and the second mechanical vibration, respectively, wherein in a specific frequency range, a ratio of an intensity of the first mechanical vibration to an intensity of the first signal is greater than a ratio of an intensity of the second mechanical vibration to an intensity of the second signal; wherein a first angle formed by a vibration direction of the microphone and a direction of the first mechanical vibration is within a set angle range, and the first angle is within an angle range of 20 degrees to 90 degrees.

2. The acoustic input-output device of claim 1, wherein the loudspeaker assembly is a bone conduction loudspeaker assembly, the bone conduction loudspeaker assembly includes a housing and a vibration component that is connected to the housing and configured to generate the first mechanical vibration, and the microphone is directly or indirectly connected to the housing.

3. The acoustic input-output device of claim 2, wherein when a user wears the acoustic input-output device, a clamping force formed between the acoustic input-output device and a contact portion of the user is within a range of 0.1N to 0.5N.

4. The acoustic input-output device of claim 1, further comprising a damping structure, wherein the microphone is connected to the loudspeaker assembly through the damping structure.

5. The acoustic input-output device of claim 4, wherein the damping structure includes a vibration reduction material with an elastic modulus less than a first threshold, or a thickness of the damping structure is within a range of 0.5 mm to 5 mm.

6. The acoustic input-output device of claim 5, wherein the elastic modulus of the vibration reduction material is within a range of 0.01 Mpa to 1000 Mpa.

7. The acoustic input-output device of claim 4, wherein a first portion of a surface of the microphone is configured to conduct the second mechanical vibration, and a second portion of the surface of the microphone is provided with the damping structure and connected to the loudspeaker assembly through the damping structure.

8. The acoustic input-output device of claim 7, wherein the first portion of the surface of the microphone is provided with a vibration transmission layer, and an elastic modulus of a material of the vibration transmission layer is greater than a second threshold.

9. The acoustic input-output device of claim 1, wherein the loudspeaker assembly includes a housing and a vibration component, there is a first connection between the housing and the vibration component, there is a second connection between the microphone and the housing, and the first connection includes a first damping structure.

10. The acoustic input-output device of claim 9, wherein the second connection includes a second damping structure, a mass of the vibration component is within a range of 0.005 g to 0.3 g, or when a user wears the acoustic input-output device, a clamping force formed between the acoustic input-output device and a contact portion of the user is within a range of 0.01N to 0.05N.

11. The acoustic input-output device of claim 1, wherein the loudspeaker assembly includes a first diaphragm and a second diaphragm, and vibration directions of the first diaphragm and the second diaphragm are opposite.

12. The acoustic input-output device of claim 11, wherein the loudspeaker assembly includes a housing, the housing including a first cavity and a second cavity, the first diaphragm and the second diaphragm being located in the first cavity and the second cavity, respectively; and a first sound transmission hole and a second sound transmission hole are set on different side walls of the first cavity, a third sound transmission hole and a fourth sound transmission hole are set on different side walls of the second cavity, a phase of sound transmitted by the first sound transmission hole is the same as a phase of sound transmitted by the third sound transmission hole, and a phase of sound transmitted by the second sound transmission hole is the same as a phase of sound transmitted by the fourth sound transmission hole.

13. The acoustic input-output device of claim 12, wherein the first sound transmission hole and the third sound transmission hole are arranged on a first side wall of the housing, the second sound transmission hole and the fourth sound transmission hole are arranged on a second side wall of the housing, the first side wall for setting the first sound transmission hole and the third sound transmission hole is different from the second side wall for setting the second sound transmission hole and the fourth sound transmission hole, the first sound transmission hole and the second sound transmission hole are arranged on non-adjacent side walls of the housing, and the third sound transmission hole and the fourth sound transmission hole are arranged on the non-adjacent side walls of the housing.

14. The acoustic input-output device of claim 12, wherein the loudspeaker assembly further includes a first magnetic circuit assembly and a second magnetic circuit assembly configured to form a magnetic field, the first magnetic circuit assembly being configured to cause the first diaphragm to vibrate, the second magnetic circuit assembly being configured to cause the second diaphragm to vibrate; and the first cavity and the second cavity are spatially connected, and the first magnetic circuit assembly and the second magnetic circuit assembly are connected directly or indirectly.

15. The acoustic input-output device of claim 1, wherein the voice signal source is a vibration portion of a user providing the voice signal, and when the user wears the acoustic input-output device, a distance between the vibration portion of the user and the microphone is less than a third threshold, wherein the third threshold is not larger than 20 cm.

16. The acoustic input-output device of claim 1, wherein a ratio of the intensity of the second signal to the intensity of the first signal is greater than a threshold, wherein the ratio of the intensity of the second signal to the intensity of the first signal is greater than ¼.

17. An acoustic input-output device, comprising:

a loudspeaker assembly configured to transmit sound waves by generating a first mechanical vibration; and a microphone configured to receive a second mechanical vibration of a voice signal source that is generated when the voice signal source provides a voice signal, the microphone generating a first signal and a second signal in response to the first mechanical vibration and the second mechanical vibration, respectively; and a first angle formed by a vibration direction of the microphone and a direction of the first mechanical vibration is within a set angle range so that in a specific frequency range, a ratio of an intensity of the first mechanical vibration to an intensity of the first signal is greater than a ratio of an intensity of the second mechanical vibration to an intensity of the second signal, wherein the first angle is within an angle range of 20 degrees to 90 degrees.

18. The acoustic input-output device of claim 1, wherein a second angle formed by the vibration direction of the microphone and a direction of the second mechanical vibration is within a set angle range.

19. The acoustic input-output device of claim 18, wherein the second angle is within an angle range of 0 degrees to 85 degrees.

* * * * *